United States Patent
Kurahashi et al.

(10) Patent No.: US 6,278,480 B1
(45) Date of Patent: *Aug. 21, 2001

(54) COMPOUND EYE CAMERA SYSTEM

(75) Inventors: Sunao Kurahashi, Kawasaki; Katsumi Iijima, Hachioji; Kotaro Yano, Yokohama; Hideki Morishima; Katsuhiko Mori, both of Kawasaki; Takeo Sakimura, Urayasu, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,652

(22) Filed: Feb. 4, 1998

(30) Foreign Application Priority Data

Feb. 7, 1997 (JP) .................................... 9-025242
Jun. 2, 1997 (JP) .................................... 9-157314

(51) Int. Cl.[7] .................................................. H04N 9/47
(52) U.S. Cl. .......................... 348/59; 396/326; 396/324; 396/377; 396/20; 396/332
(58) Field of Search ................... 348/59, 42, 50, 348/51, 52; 358/108; 396/326, 324, 377, 20, 332

(56) References Cited

U.S. PATENT DOCUMENTS

| | | | |
|---|---|---|---|
| 4,516,157 | * 5/1985 | Campbell | 358/108 |
| 4,797,736 | * 1/1989 | Kloots et al. | 358/93 |
| 4,910,543 | 3/1990 | Kawamura et al. | 354/173.1 |
| 5,070,349 | 12/1991 | Haraguchi et al. | 354/152 |
| 5,315,377 | * 5/1994 | Isano et al. | 348/51 |
| 5,329,328 | 7/1994 | Haraguchi et al. | 354/152 |
| 5,523,886 | * 6/1996 | Johnson-Williams et al. | 348/52 |
| 5,832,325 | * 11/1998 | Ito et al. | 348/42 |
| 5,937,212 | * 8/1999 | Kurahashi et al. | 348/38 |

FOREIGN PATENT DOCUMENTS

| | | |
|---|---|---|
| 62-21396 | 1/1987 | (JP) . |
| 3-65943 | 3/1991 | (JP) . |
| 5-107663 | 4/1993 | (JP) . |
| 7-234459 | 9/1995 | (JP) . |
| 8-148601 | 6/1996 | (JP) . |
| 8-148612 | 6/1996 | (JP) . |
| 8-261207 | 10/1996 | (JP) . |

* cited by examiner

Primary Examiner—Chris Kelly
Assistant Examiner—Shawn S. An
(74) Attorney, Agent, or Firm—Fitzpatrick, Cella, Harper & Scinto

(57) ABSTRACT

A compound eye camera provided integrally with plural image pickup elements and a display unit adapted to display an image, divided into stripes in every scanning line or in every plural scanning lines and to give different directionalities to the display of the striped image in the odd-numbered lines and the display of the striped image in the even-numbered lines, thereby providing stereoscopic display at a predetermined observing position. The camera further has a display control unit for dividing each of two images, picked up with the plural image pickup elements and having a parallax, into stripes in the horizontal direction and alternately arranging the divided stripes by every line to synthesize a striped image, and causing the display unit to display such synthesized striped image.

10 Claims, 25 Drawing Sheets

FIG. 2B
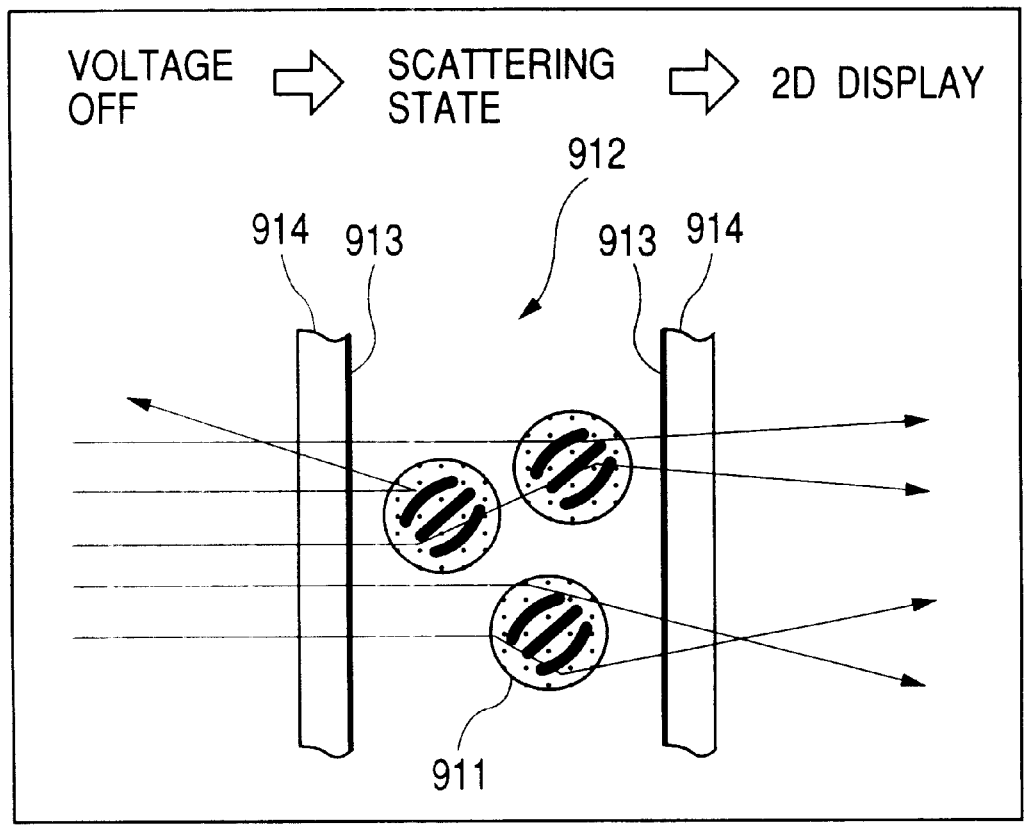
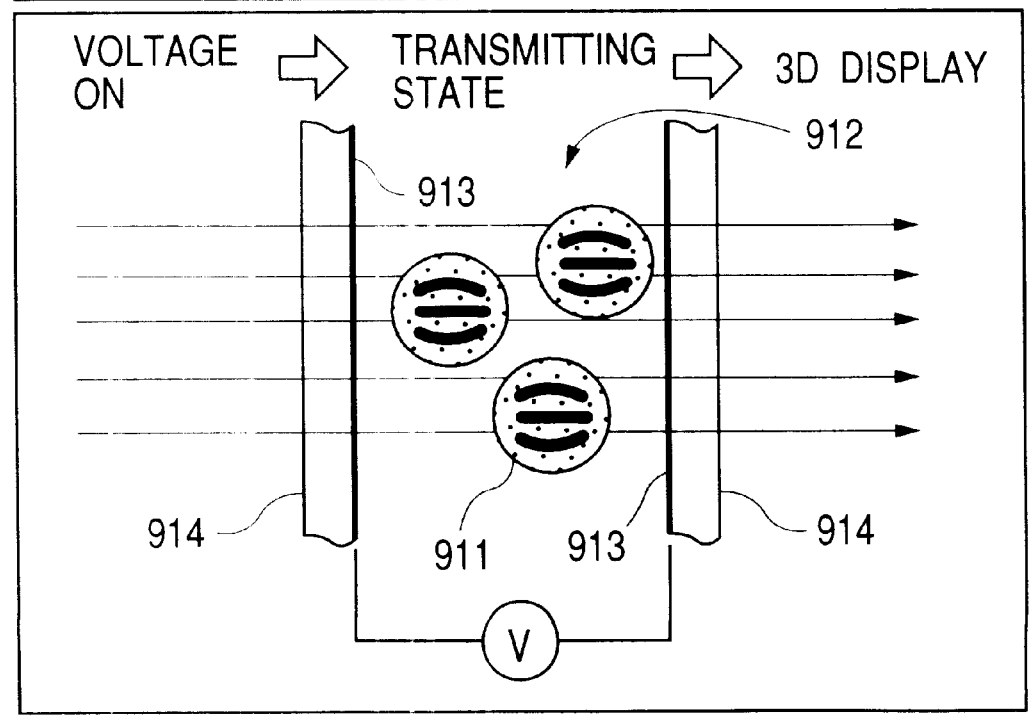

FIG. 5

| LEFT IMAGE | L0, L1, L2, L3, L4, L5, L6, L7, L8, . . . . . . . . . . . . . . . L479 |
|---|---|
| RIGHT IMAGE | R0, R1, R2, R3, R4, R5, R6, R7, R8, . . . . . . . . . . . . . . . R479 |

↓ COMPRESSION TO 1/2 IN BOTH VERTICAL AND HORIZONTAL DIRECTIONS

| COMPRESSED LEFT IMAGE | L'0, L'1, L'2, L'3, L'4, L'5, L'6, L'7, L'8, . . . . . L'239 |
|---|---|
| COMPRESSED RIGHT IMAGE | R'0, R'1, R'2, R'3, R'4, R'5, R'6, R'7, R'8, . . . . . R'239 |

↓ INTERLACE SYNTHESIZATION

| | | |
|---|---|---|
| INTERLACE SYNTHESIZED IMAGE | EXAMPLE 1 | L'1, R'1, L'3, R'3, L'5, R'5, L'7, R'7, L'9, . . . . . . R'239 |
| | EXAMPLE 2 | L'0, R'0, L'2, R'2, L'4, R'4, L'6, R'6, L'8, . . . . . . R'238 |
| | EXAMPLE 3 | R'0, L'1, R'2, L'3, R'4, L'5, R'6, L'7, R'8, . . . . . . L'239 |
| | EXAMPLE 4 | R'0, L'0, R'2, L'2, R'4, L'4, R'6, L'6, R'8, . . . . . . L'238 |
| | EXAMPLE 5 | R'1, L'1, R'3, L'3, R'5, L'5, R'7, L'7, R'9, . . . . . . R'239 |

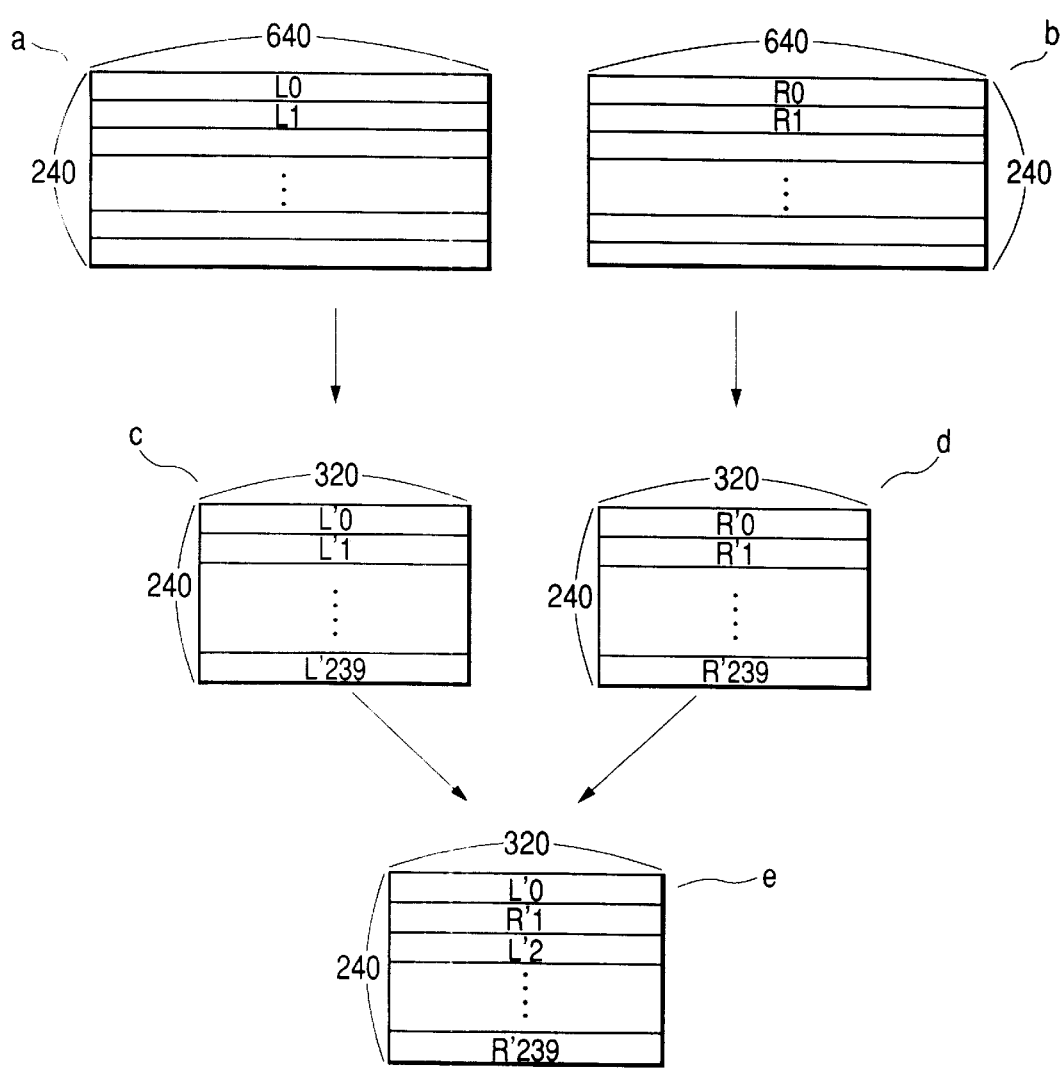

FIG. 8
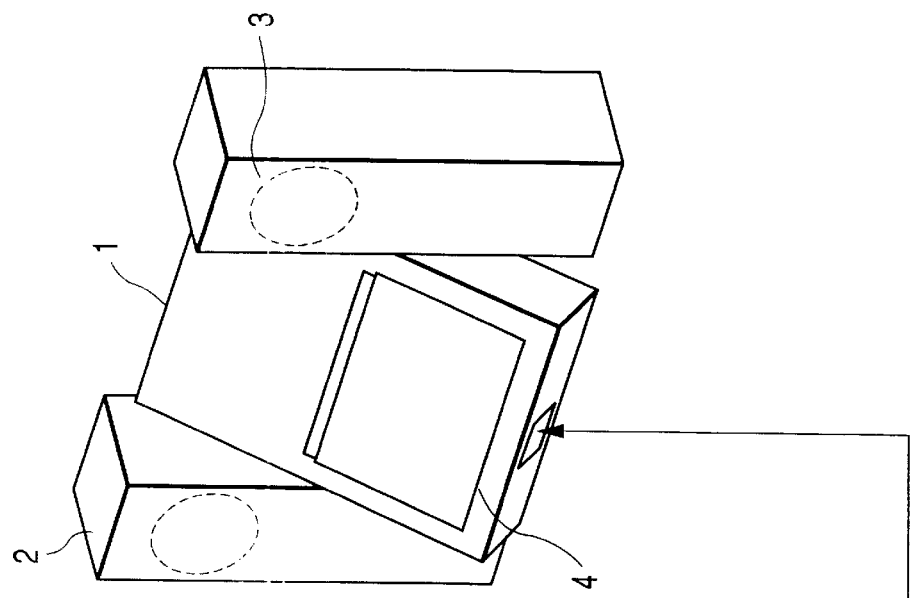
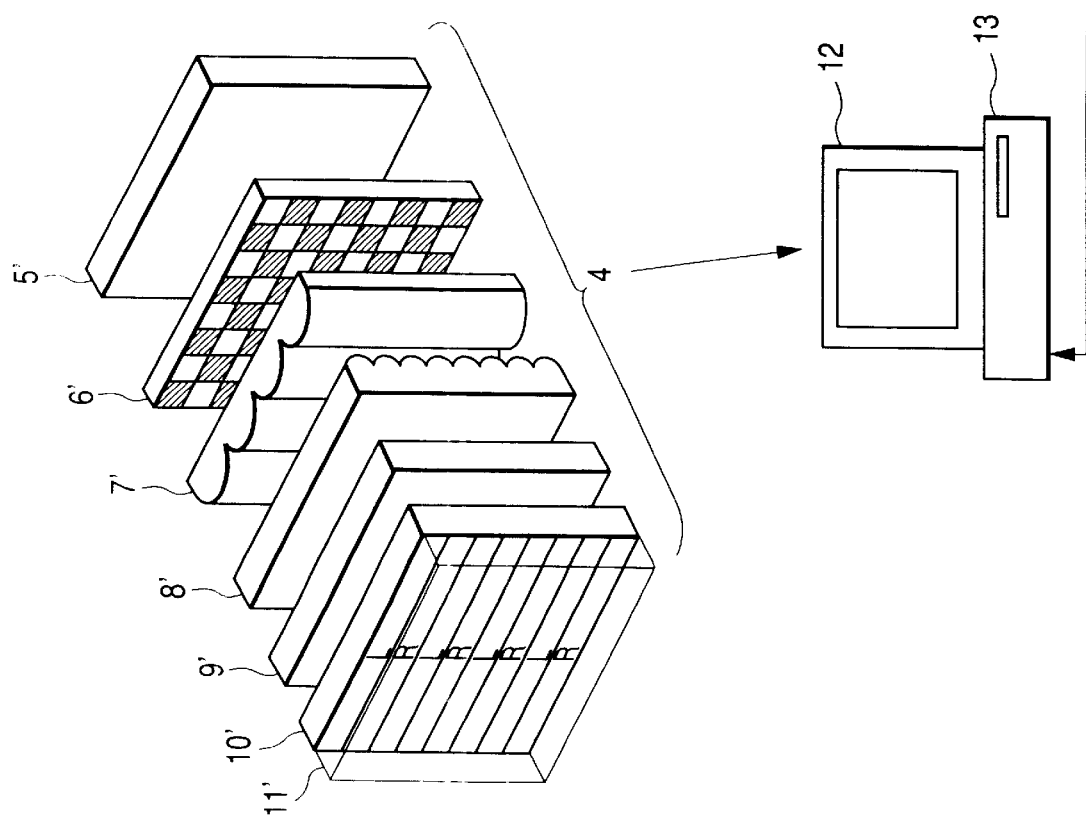

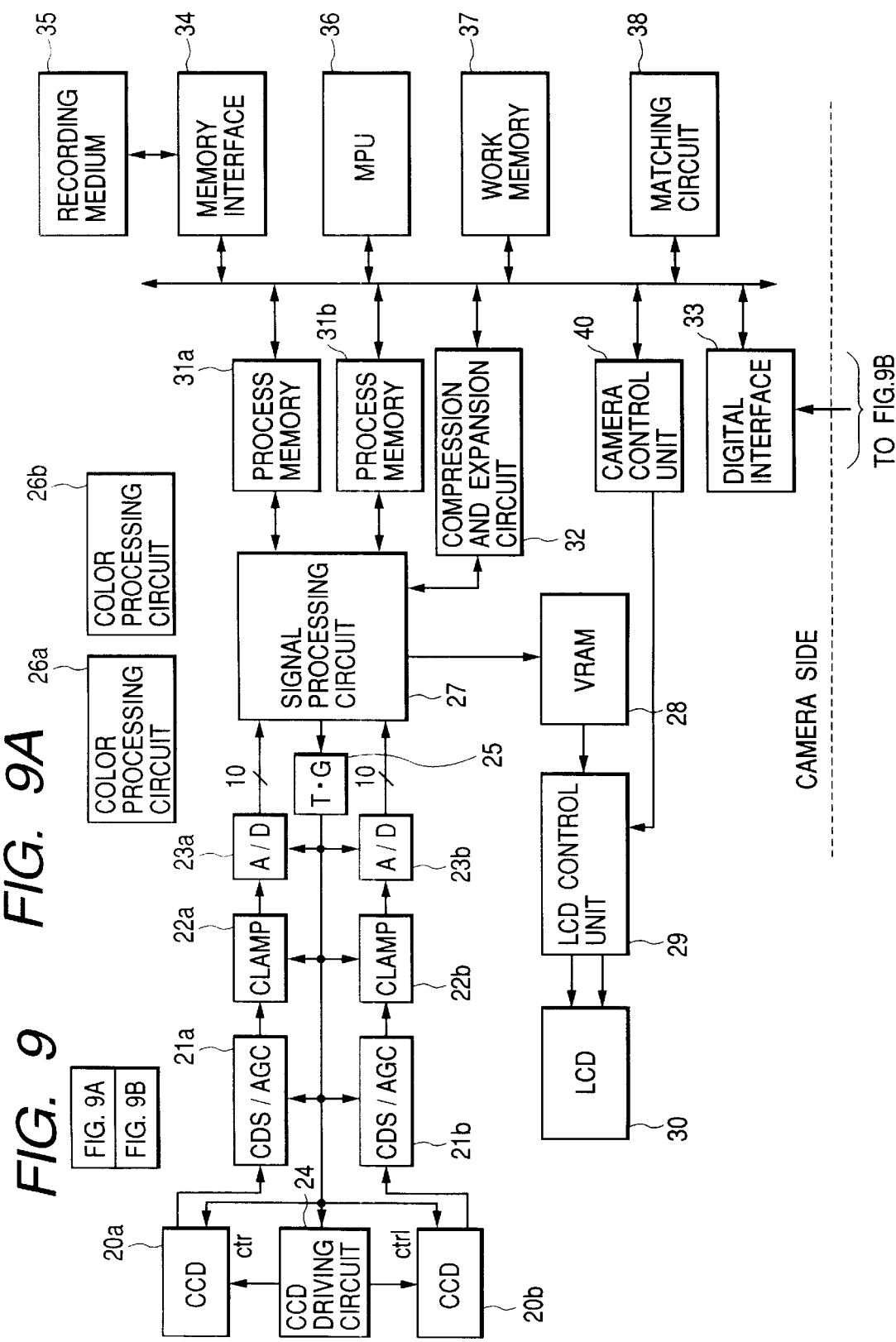

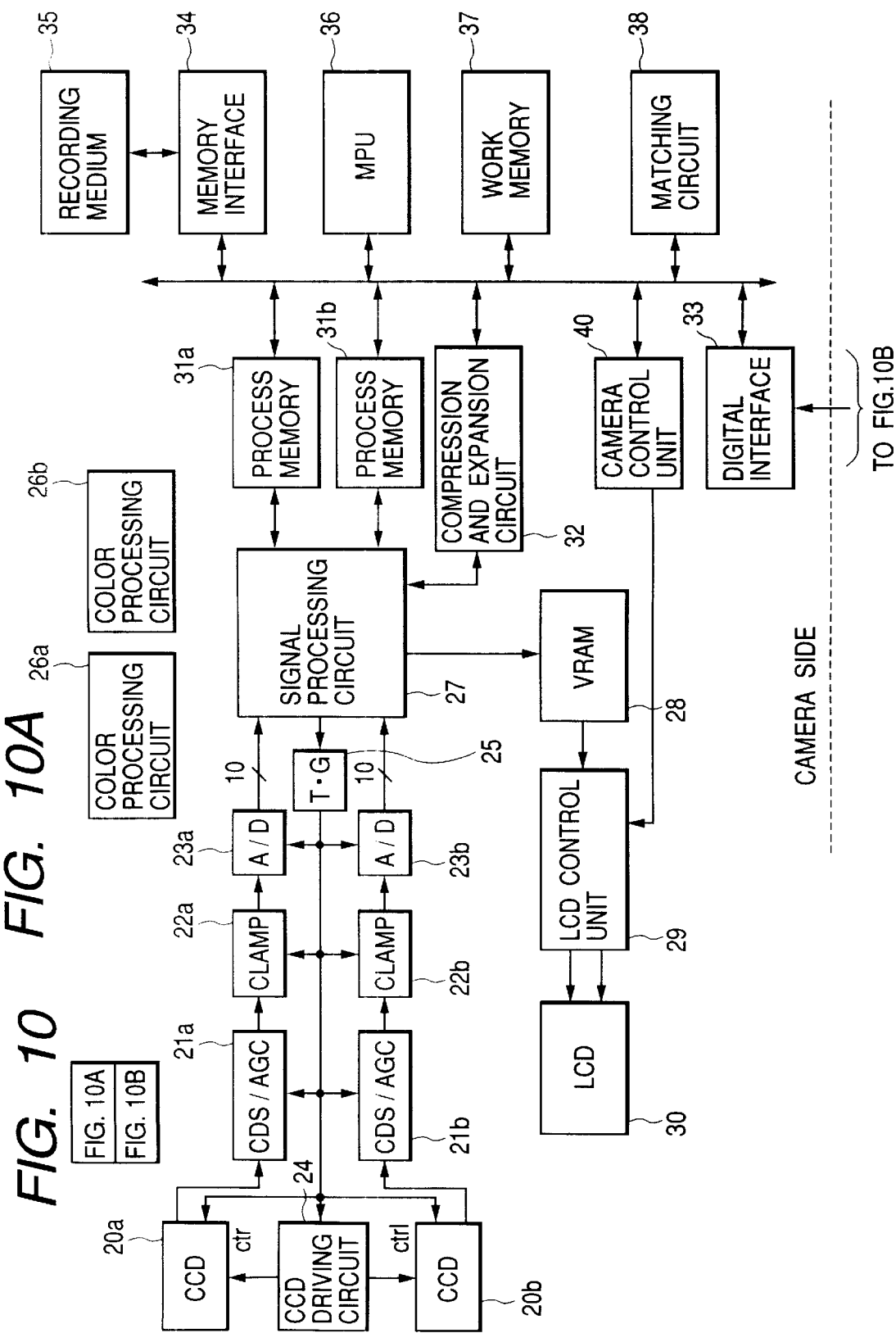

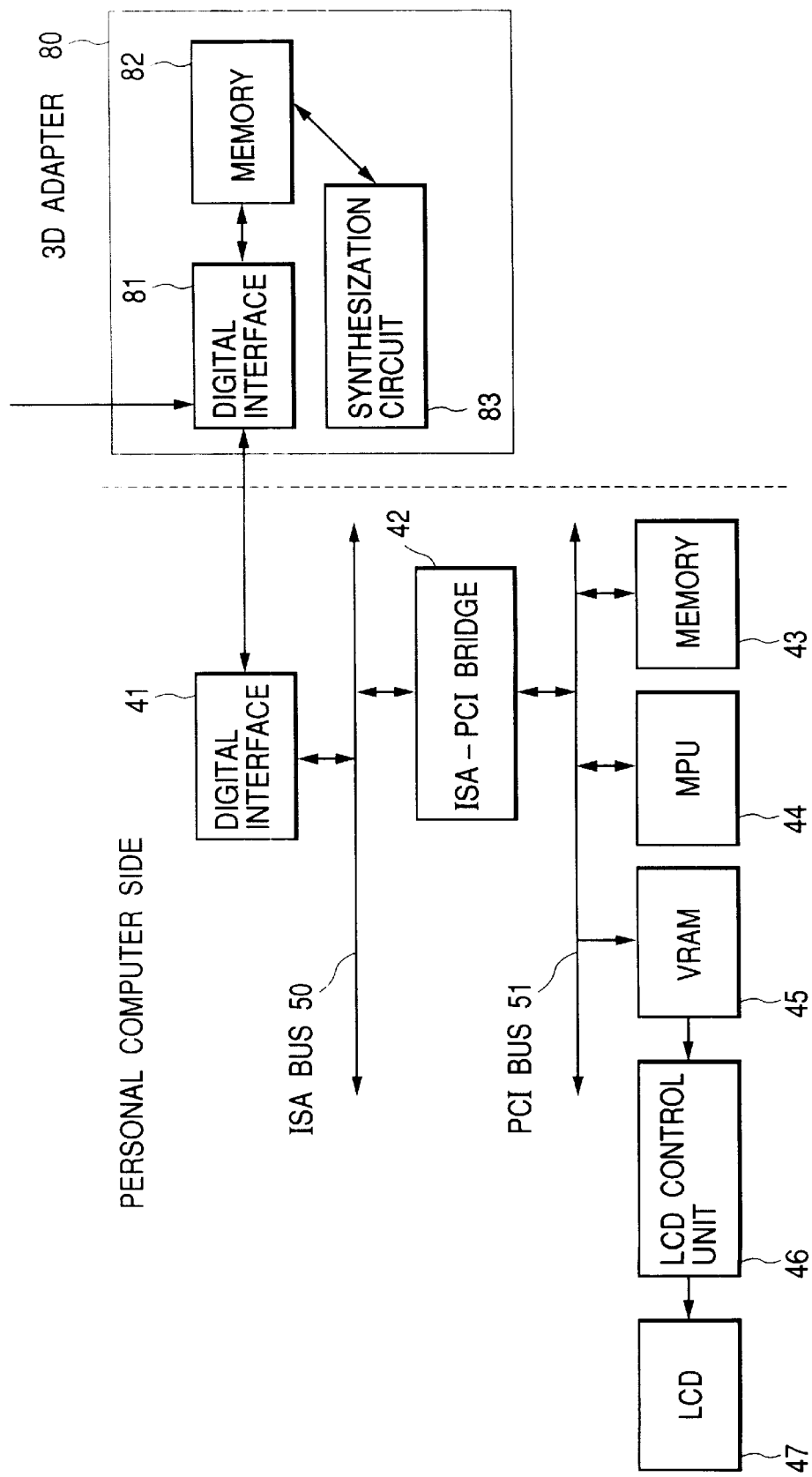

EVEN FRAME      ODD FRAME

| FIG. 20A |
| FIG. 20B |

COMPOUND EYE CAMERA SYSTEM

BACKGROUND OF THE INVENTION

1. Field of the Invention

The present invention relates to a compound eye camera capable of picking up and displaying a stereoscopic image and a two-dimensional image, and also to an image display system utilizing such compound eye camera.

2. Related Background Art

For picking up and displaying a stereoscopic image, there is already known, for example, a stereoscopic television apparatus as disclosed in the Japanese Patent Application Laid-Open No. 62-21396, in which a set of images with parallax is obtained from plural cameras and presented to the operator as a stereoscopic image by stereoscopic display on a stereoscopic image display apparatus designed exclusively for the system. Such a stereoscopic image display system is generally composed of a camera for image pickup and a separate display apparatus for displaying the stereoscopic image, and, in general, after the image is picked up with the camera separate from the display, the picked-up image is displayed and edited on the display.

Also for obtaining the stereoscopic display, there is known a stereoscopic television system in which the image for the right eye and that for the left eye are respectively given different polarized states of light and are separated by polarizing spectacles. More specifically, a liquid crystal shutter is provided on the shutter and the polarizing state is switched in synchronization with the field signal of the image displayed on the display for obtaining different polarized states, and the observer wears the polarizing spectacles whereby the left- and right-eye images are respectively separated for the left and right eyes on a time-shared basis to enable stereoscopic observation. This method, however, has been associated with a drawback that the observer always has to wear the polarizing spectacles.

For obtaining stereoscopic display without the polarizing spectacles, there is known a system of providing a lenticular lens in front of the display, thereby spatially separating images for the left and right eyes. FIGS. 11A and 11B are schematic views of such stereoscopic display system employing a lenticular lens, wherein FIG. 11A is a cross-sectional view of the pixel display unit of a liquid crystal display, seen from above the observer, while FIG. 11B is a view showing the filter configuration of the pixel display unit.

The pixel display unit 60 shows displayed pixels of a liquid crystal display, of which the glass substrates, color filter, electrodes, polarizing plates, rear light source etc. are omitted. As shown in FIG. 11B, the pixel display unit 60 is composed of apertures 61 constituting pixels and provided with color filters and a black matrix 62 for separating the pixels. On the display surface of the liquid crystal display, there is provided a lenticular lens 63 consisting of cylindrical lenses having a semicircular cross section and extending perpendicularly to the plane of the drawing, and the pixel display unit 60 of the liquid crystal display is positioned at the focal plane of the lenticular lens. On the pixel display unit 60, right-eye images (R) and left-eye images (L) are alternately positioned in paired stripes each of which corresponds to a pitch of the lenticular lens 63 as illustrated and are focused, in optically separate manner, respectively on the right eye $E_R$, $E_L$ by the lenticular lens 63 whereby the stereoscopic observation is rendered possible.

FIG. 11A only illustrates the spatial areas where the left-eye image and the right-eye image can be respectively observed by the lenticular lens at the central part of the display, but the spatial areas separated for the left- and right-eye images similarly exist for other parts of the lenticular lens and these areas overlap at the left and right eyes of the observer whereby the left- and right-eye images can be separately observed over the entire displayed image.

In addition to the foregoing, there are known other stereoscopic image display systems such as those disclosed in the Japanese Patent Application Laid-Open Nos. 5-107663 and 7-234459. As an example, FIGS. 12A to 12C show the basic configuration of a stereoscopic image display apparatus disclosed in the Japanese Patent Application Laid-Open No. 7-234459.

This stereoscopic image display apparatus is composed of a light directionality switching device 72 consisting of a matrix planar light source 70 and a lenticular lens 71, and a transmission display device 73. When a stripe-shaped light source for the right eye (70R in FIG. 12B) is turned on, a right-eye image (73R in FIG. 12C) is displayed in synchronization by an odd-numbered frame (field), and, when a stripe-shaped light source for the left eye (70L in FIG. 12B) is turned on, a left-eye image (73L in FIG. 12C) is displayed in synchronization by an even-numbered frame (field), whereby all the pixels can be utilized according to the even-numbered and odd-numbered frames (fields). In this case the pixels need not be divided.

In the conventional systems, as explained in the foregoing, the compound eye camera is separated from the stereoscopic display, and the compound eye camera itself is not provided with the function of displaying the stereoscopic image. For this reason, it is common to at first pick up the image with the camera which is separate from the display, and then to edit the picked-up image by displaying the same on the display device. In such operations, however, whether the obtained stereoscopic image is satisfactory can only be judged at the editing operation, and it has therefore been difficult to obtain a satisfactory stereoscopic image in a simple manner. For this reason, there has strongly been desired a compound eye camera provided with the display function.

Also in the above-mentioned conventional stereoscopic image display systems, there has not been considered the connection to the systems utilizing personal computer, which are the current mainstream of the image systems. Consequently, in case of fetching and displaying the stereoscopic image, picked up with the compound eye camera, in a personal computer, the user has to reconstruct the system anew and is therefore given a significant burden.

Also the aforementioned system employing the lenticular lens on the surface of the liquid crystal display for attaining the stereoscopic observation is associated with unsatisfactory image display because the image quality is deteriorated by the surface reflection of the lens etc., and the black matrix of the liquid crystal display generates Moire fringes. Also the aforementioned system employing time-shared display of the right-eye and left-eye images with parallax for attaining the stereoscopic observation has to effect high-speed switching of the images for avoiding flickering. For example Isono et al., "Condition for time-shared stereoscopic observation", Journal of Television Association, Vol. 41, No. 6, pp546–555 (1987) indicated that the stereoscopic observation could not be obtained in a time-shared system with a field (frame) frequency of 30 Hz. They also indicated that the limit frequency that does not give the flickering phenomenon when both eyes are alternately opened (called critical fusion frequency (CFF)) was about 55 Hz and that the field (frame) frequency has to be at least 110 Hz in consideration of the flickering. Consequently, in the conventional display systems, there is required a transmission display device capable of high-speed display. These drawbacks and limitations in the conventional stereoscopic display systems have to be picked up into consideration in providing the compound eye camera or the image display system with the stereoscopic display function.

SUMMARY OF THE INVENTION

A first object of the present invention is to provide a portable video camera capable of picking up, displaying or recording a stereoscopic image.

A second object of the present invention is to provide a compound eye camera with stereoscopic display function not associated with the aforementioned drawbacks and not requiring a high display speed (frame rate) in the stereoscopic image display, and also to provide an image display system capable of fetching and displaying a stereoscopic image on a personal computer.

A third object of the present invention is to provide a compact compound eye camera apparatus capable of displaying an ordinary two-dimensional image and a stereoscopic image in a simple manner.

The above-mentioned objects can be attained, according a preferred embodiment of the present invention, by a compound eye camera integrally provided with plural image pickup means and display means adapted to display images, in stripe shapes divided for every scanning line or every plural scanning lines and having different directionality in the odd-numbered lines and that of the even-numbered lines in such stripe-shaped image, thereby providing stereoscopic display in a predetermined observing position, the compound eye camera comprising display control means for dividing each of two images with a parallax, picked up with plural image pickup means, into horizontal stripes, then alternately arranging thus divided images by every line to synthesize a striped image and causing the display means to display such synthesized striped image.

Also the above-mentioned objects can be attained, according a preferred embodiment of the present invention, by a compound eye camera provided with plural image pickup means for picking up images with a parallax, comprising image synthesis means for dividing each of the images with a parallax, picked up with the image pickup means, into horizontal stripes, and alternately arranging thus divided images to synthesize a striped image, a digital interface connected to an external apparatus through an interface cable, and control means for transmitting the image synthesized by the image synthesis means through the digital interface.

Still another object of the present invention is to provide a compound eye camera enabling confirmation of the stereoscopic image and adjustment of parallax in the course of the image pickup operation.

Still another object of the present invention is to provide a stereoscopic image input device adapted for inputting a stereoscopic image into a personal computer or the like.

Still other objects of the present invention, and the features thereof, will become fully apparent from the following description which is to be taken in conjunction with the appended drawings.

BRIEF DESCRIPTION OF THE DRAWINGS

FIG. 2A is a view showing the working principle of a display of the rear barrier lenticular system, while FIG. 2B is a view showing the working principle of a PDLC;

FIG. 5 is a view showing an example of interlaced synthesis;

FIG. 6 is a schematic view showing the image synthesis in the signal processing circuit in a field accumulation mode;

FIG. 8 is a view showing an embodiment of the image display system of the present invention;

FIG. 10, which is composed of FIGS. 10A and 10B, is a block diagram showing an example of interlaced synthesis with an adapter;

DETAILED DESCRIPTION OF THE PREFERRED EMBODIMENTS

Now the present invention will be clarified in detail by preferred embodiments thereof, with reference to the attached drawings.

Figure 1:
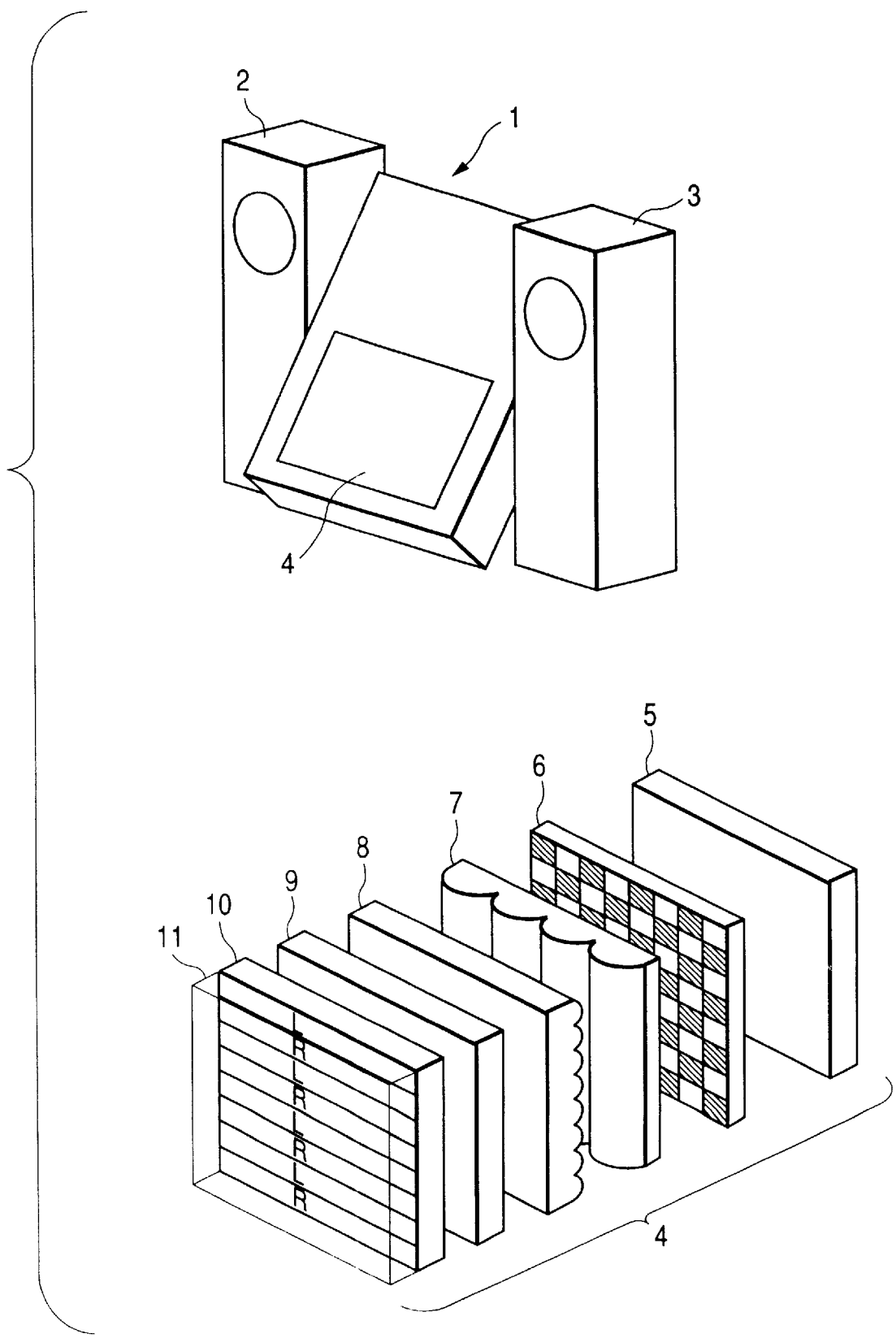
FIG. 1 is a schematic view showing an embodiment of the compound eye camera of the present invention.

FIG. 1 is a view showing a first embodiment of the compound eye camera 1 of the present invention, wherein the compound eye camera is integrally provided with image pickup optical systems 2, 3 provided respectively at left and at right and a display device 4 for displaying a stereoscopic image and a two-dimensional image based on parallax images picked up with the image pickup optical systems 2, 3, and further incorporates a circuit (not shown) for controlling the image display on the display device 4.

Each of the image pickup optical systems 2, 3 is provided with a lens barrel containing a lens therein, and these systems are positioned respectively at left and at right sides thereof for obtaining stereoscopic images or a panorama image and are constructed so as to have a long baseline. In the present embodiment, the image pickup optical systems 2, 3 are provided on both sides of the display device 4 with a fixed relative positional relationship. The display device 4 is rendered rotatable in the tilting direction but the relative positional relationship of the image pickup optical systems 2, 3 remains unchanged even when the display device 4 is tilted.

The display device 4 is composed of a rear light source 5 constituting the illuminating light source, an aperture mask 6 with checkered-pattern translucent apertures, lenticular lenses 7, 8, a PDLC (polymer dispersed liquid crystal) 9, a pixel display unit 10 composed of a liquid crystal layer, and a glass substrate 11, which are laminated in succession, and is capable of displaying a stereoscopic image or a panorama image according to the selected mode. The mask pattern of the aperture mask 6 is composed of an evaporated metal film such as of chromium or a light absorbing material, which is formed by a known patterning technology on a mask substrate of glass or resinous material. The lenticular lenses 7, 8 provided between the aperture mask 6 and the liquid crystal pixel display unit 10 are respectively composed of microlenses of glass or resinous material and are positioned so as to be mutually orthogonal. In the display device 4 shown in FIG. 1, there are omitted polarizing plates, color filter, electrodes, black matrix, antireflection film, etc.

The stereoscopic display by the display device 4 is a so-called rear barrier lenticular system.

Figure 2A:
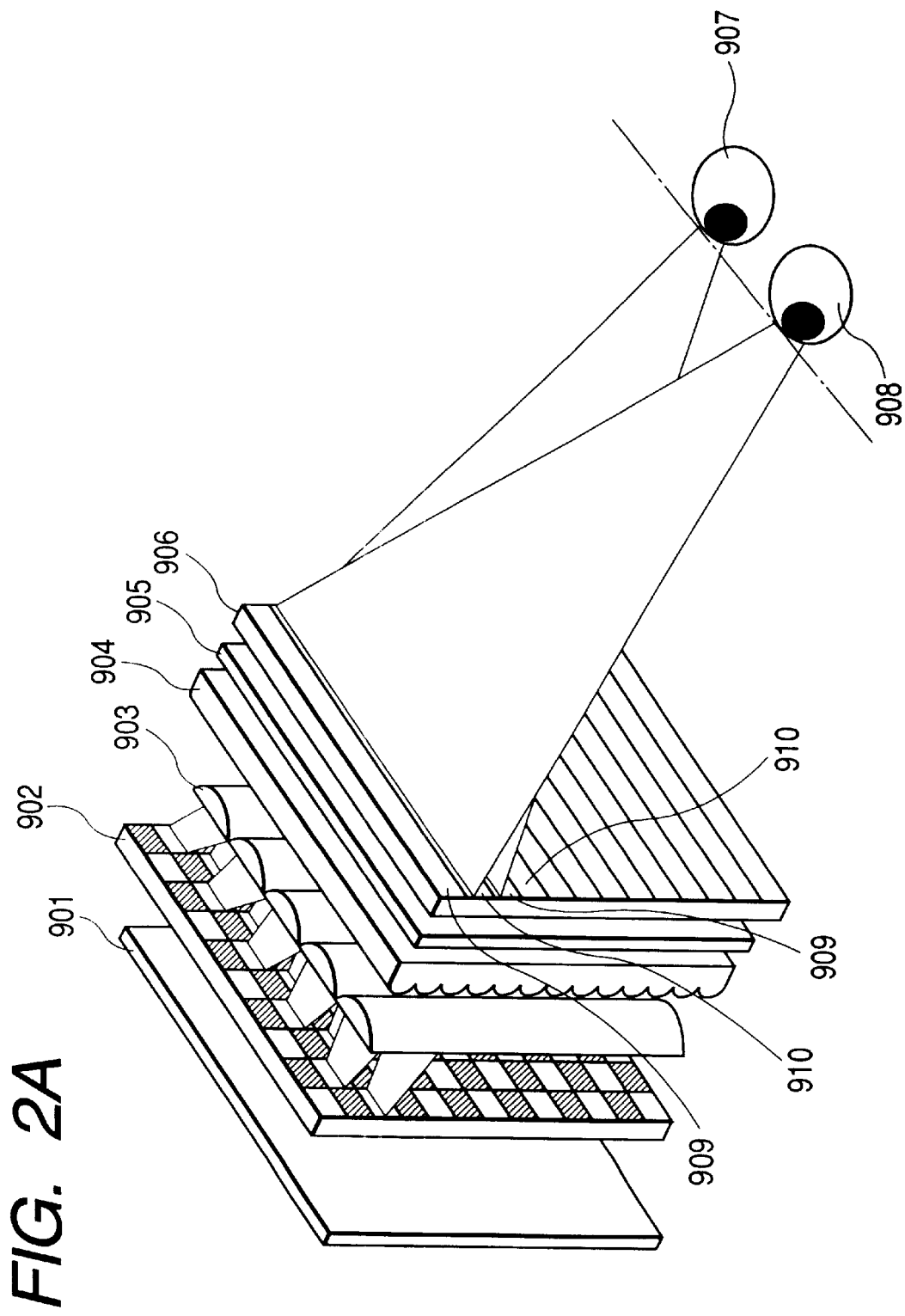

FIG. 2A shows the working principle of the display of the rear barrier lenticular system. The display of the rear barrier lenticular system is composed of a rear light source 901, a checkered pattern mask 902, a lenticular lens A 903, a lenticular lens B 904, a PDLC (polymer dispersed liquid crystal) 905, and a display LCD 906. The light emitted from the rear light source 901 is transmitted by the checkered-pattern mask 902, in order to separate the illuminating lights which respectively display the left and right images with directionality. Thus separated illuminating light enter the lenticular lenses 903, 904. When the lights separated by the checkered-pattern mask 902 enters the lenticular lens 903, composed of an array of vertical lenticular lenses, the light separated for displaying the right image is refracted to the left with respect to the display or toward the right eye 907 of the observer, while the light separated for displaying the left image is refracted to the right with respect to the display or toward the left eye 908 of the observer. Similarly the lenticular lens 904 is composed of an array of horizontal lenticular lenses. In contrast to the lenticular lens 903 which separates the images at left and at right, lenticular lens 904 serves to expand the viewing area in the vertical direction. The light is thus separated with directionality. On the LCD 906, left pixels 910 and right pixels 909 alternate in every line in the vertical scanning direction by a stereoscopic image display control unit. When the pixels arranged in stripes are illuminated by the lights transmitted by the lenticular lenses 903, 904 and the PDLC 905, the right pixels 909 are projected toward the right-hand portion of the viewing area with respect to the observer while the left pixels 910 are projected toward the left-hand portion of the viewing areas, whereby the observer can observe a stereoscopic image.

In the following there will be explained the working principle of the PDLC 905. In the PDLC 905, as shown in FIG. 2B, special polymer 912 containing liquid crystal molecules 911 is present between electrodes 913, which are sandwiched between substrates 914. When a voltage is applied between the electrodes 913, the liquid crystal molecules 911 present in the special polymer 912 assumes a transmission state, whereby light with left and right directionalities, transmitted by the lenticular lenses 903, 904 is further transmitted. Consequently the images on the display LCD 906 are separated to the left and to the right and the observer can observe a stereoscopic image. On the other hand, without the voltage application, the liquid crystal molecules in the special polymer 912 assumes a scattered (random) state, whereby the light with left and right directionalities, transmitted by the lenticular lenses 903, 904 loses such directionality and the image on the LCD 906 is displayed as a two-dimensional image. The display on the PDLC 905 is switched by a control signal from a stereoscopic image display control unit in the PC. This switching is executed in the unit of each window, so that a two-dimensional image and a three-dimensional (stereoscopic) image can be switched, on the display, according to the selected mode.

In the compound eye camera 1 of the above-explained embodiment, the left and right images picked up with the image pickup optical systems 2, 3 are once stored in a memory device (not shown) provided in the main body of the compound eye camera, and are then transmitted therefrom as an image signal to the display device 4. The display device 4 executes display of a stereoscopic image or a panoramic image based on the image signal (left and right images) transmitted from the image pickup optical systems 2, 3, according to the set mode.

In a stereoscopic image pickup mode, left and right images with a parallax are picked up by the image pickup optical systems 2, 3 and are transmitted, as image signals, to the display device 4. On the display device 4, the left and right images with a parallax are alternately arranged in the vertical direction in the form of horizontal stripes, and a synthesized image consisting of such horizontal stripes is displayed on the pixel display unit 10, which is illuminated by light coming from the rear light source 5 and transmitted by the apertures of the aperture mask 6, the lenticular lenses 7, 8 and the PDLC 9. In this illumination state, an electric field is applied to the PDLC 9 to obtain a transparent state thereof, whereby the eyes of the observer can respectively receive the left and right images with a parallax based on the above-explained display principle of the rear barrier lenticular system to observe a stereoscopic image.

In a panoramic image pickup mode, mutually overlapping left and right images are picked up with the image pickup optical systems 2, 3, and are transmitted as image signals to the display device 4. In the display device 4, a panoramic image is obtained by combining the left and right images in the lateral direction in such a manner that they mutually match at the overlapping portion (the overlapping portion being taken from either of the left and right images) and is displayed on the pixel display unit 10. In the illumination state in this panoramic image pickup mode, no electric field is applied to the PDLC 9, whereby light with directionality is scattered by the liquid crystal molecules in the PDLC 9 and illuminates the pixel display unit 10 with disrupted directionality. Consequently, the observer observes the panoramic image in the state of a two-dimensional display.

The above-mentioned display device 4 may also be composed of light emitting device elements such as LED, capable of forming a light emission pattern with different directionalities in the odd-numbered scanning lines and in the even-numbered scanning lines. Also the left pixels 910 and the right pixels 909 are alternately arranged in every scanning line in the vertical direction, but there may also be adopted an arrangement in which the left pixels 910 and the right pixels 909 are alternated by every plural scanning lines in the vertical direction.

In the compound eye camera of the present embodiment, as explained in the foregoing, the images picked up by the image pickup optical systems 2, 3 are displayed as a stereoscopic image or a panoramic image on the display device 4, so that the photographer can observe the picked-up images on the spot or even in the course of image pickup operation. As the display device 4 is rendered rotatable in the tilting direction, it can be adjusted to a direction which is most easily observable by the photographer so that the photographer can observe the stereoscopic or panoramic image in an optimum position for observation.

Figure 3:
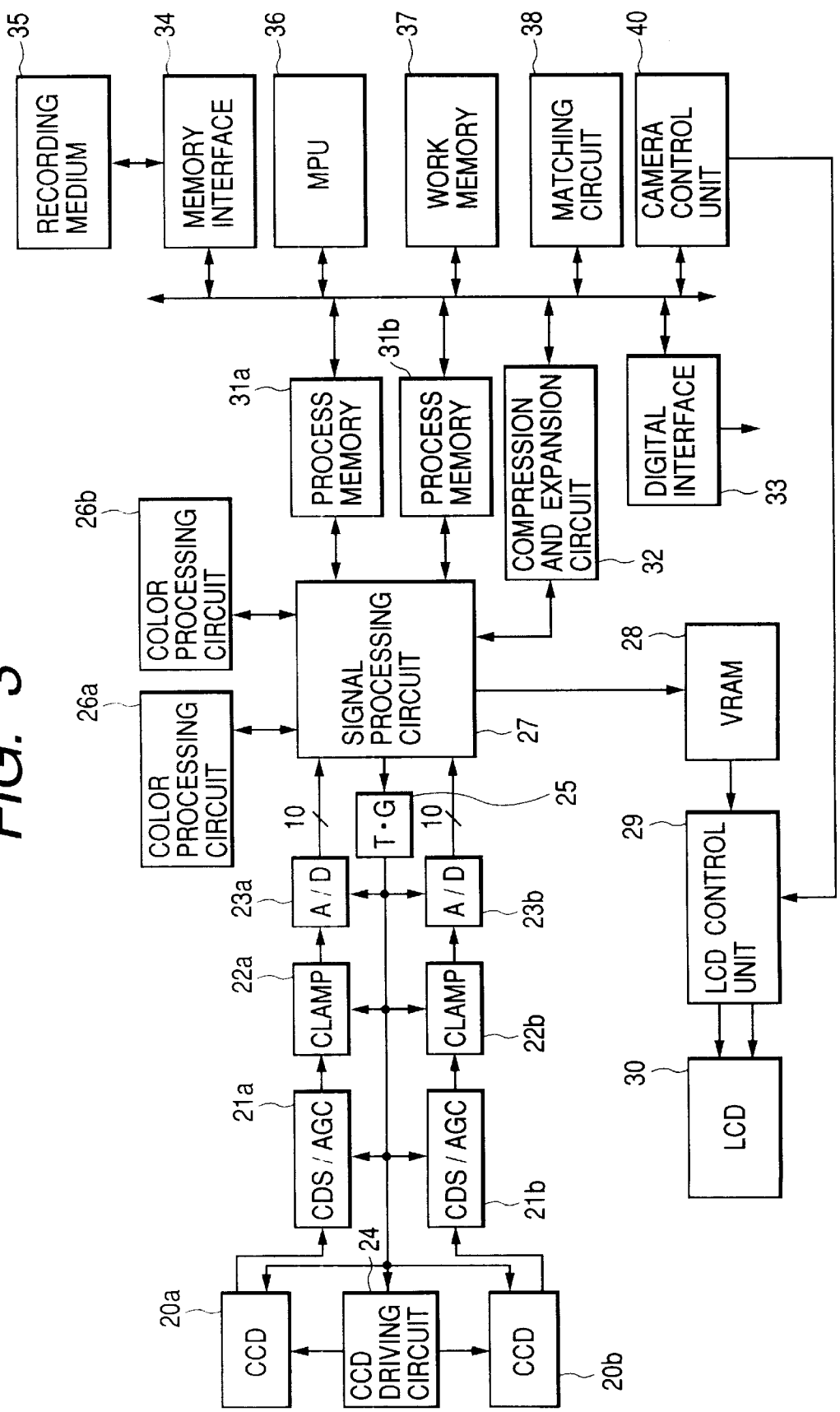
FIG. 3 is a block diagram showing the specific configuration of the compound eye camera shown in FIG. 1.

In the following there will be given a detailed explanation of the specific configuration of the above-mentioned compound eye camera. FIG. 3 is a block diagram showing the detailed configuration of the compound eye camera shown in FIG. 1.

CCD's (charge coupled devices) 20a, 20b respectively constitute the left and right image pickup optical systems 2, 3 of the compound eye camera 1 and are controlled by a CCD drive circuit 24. The left and right image signals from the CCD's 20a, 20b are respectively entered through CDS/AGC (correlated double sampling/auto gain control) circuits 21a, 21b; clamping circuit 22a, 22b; and A/D conversion circuit 23a, 23b into a signal processing circuit 27, and all the drive circuits and the processing circuits relating to the generation of the left and right image signals are synchronized under the control of a timing generator 25.

The signal processing circuit 27 is connected to color process circuits 26a, 26b; process memories 31a, 31b; a compression/expansion circuit 32 and a VRAM 28, and executes various signal processings including a color conversion process by supplying the color process circuits 26a, 26b with the left and right image signals converted into digital signals by the A/D conversion circuits 23a, 23b; conversion of the left and right digital image signals subjected to such color conversion process into a predetermined pixel size and transfer of thus converted left and right digital image signals to the VRAM 28 alternately in the vertical direction by every line; and storage of the image data in the process memories 31a, 31b. Since the number of pixels of the images stored in the process memories 31a, 31b does not necessarily coincide with that of the pixels of the image displayed on the LCD 30, as will be explained later, the image process circuit 27 is further provided with a function of pixel thinning-out and interpolation for coping with the difference in the number of pixels, in addition to the foregoing functions.

The liquid crystal display (LCD) 30 constitutes the display device 4 of the compound eye camera 1, and is controlled by an LCD control unit 29. The VRAM 28, constituting a display memory, has a capacity sufficient for the image to be displayed on the LCD 30, and, under the control by the LCD control unit 29, the contents stored in the VRAM 28 is displayed on the LCD 30. The display control of the LCD control unit 29 for the LCD 30 is executed according to the selected mode (stereoscopic image pickup mode or panoramic image pickup mode).

A camera control unit 40 is used by the photographer for input operations, such as setting of image recording or reproducing and setting of various modes (for example stereoscopic image pickup mode and panoramic image pickup mode). The camera control unit 40 is connected with the LCD control unit 29 and also with an MPU 36 through a bus line 39.

The MPU 36 is connected, through the bus line 39, with the process memories 31a, 31b; the compression/expansion circuit 32; a memory interface 34 to be connected with a recording medium 35; a work memory 37; and a matching circuit 38 and controls these units according to the inputs in the camera control unit 40. The recording medium 35 can be composed of a magnetic tape, a magnetic disk, an optical disk, a semiconductor memory or the like, but, in the present embodiment, it is composed of a flash memory.

The memory interface 34 executes storage of the image signal, contained in the process memories 31a, 31b, as a file of the digital format in an empty area of the recording medium 35, and registration of the stored file in a file management area. Also the memory interface 34 investigates the managed area of the recording medium 35 and reads the registered file data.

In the following there will be given a detailed explanation on the recording and reproducing operation in the compound eye camera. The compound eye camera of the present embodiment has two image pickup modes, namely the stereoscopic image pickup mode and the panoramic image pickup mode, which will be explained separately in the following. The images picked up by the CCD's 20a, 20b may be accumulated either by a frame accumulation mode, for accumulation in the unit of a frame, or by a field accumulation mode for accumulation in the unit of a field (a frame being composed of two fields), and the following description will be made, adopting the frame accumulation mode as an example.

(1) Stereoscopic image pickup mode

When the photographer sets the stereoscopic image pickup mode and instructs an image recording or reproducing operation on the camera control unit 40, signals corresponding to such input operations are transmitted from the camera control unit 40 to the MPU 36, which in response controls various units.

At first there will be explained the stereoscopic display of the picked-up images.

In the image pickup operation with the image pickup optical systems 2, 3, the images focused on the CCD's 20a, 20b are photoelectrically converted, and the left and right images with a parallax are supplied through the CDS/AGC circuits 21a, 21b, the clamping circuits 22a, 22b and the A/D conversion circuits 23a, 23b to the signal processing circuit 27. As the left and right parallax image signals supplied to the signal processing circuit 27 are synchronized under the control of the timing generator 25, the signal processing circuit 27 executes the following process on the parallax images picked up at a same time.

The signal processing circuit 27 sends the left and right parallax images, converted into digital signals by the A/D converters 23a, 23b, respectively to color signal processing circuits 26a, 26b, which execute a known color conversion process on the entered left and right parallax images. The left and right parallax images subjected to such color conversion are entered again into the signal processing circuit 27.

Receiving the left and right parallax images subjected to color conversion, the signal processing circuit 27 stores image data of such parallax images in the process memories 31a, 31b, and converts the left and right parallax images so as to match the pixel size of the LCD 30 and writes an interlaced image, synthesized by alternating both images by every line in the vertical direction, into the VRAM 28. Through these operations, the left and right parallax images obtained form the CCD's 20a, 20b are stored in the process memories 31a, 31b and in the VRAM 28.

Figure 4:
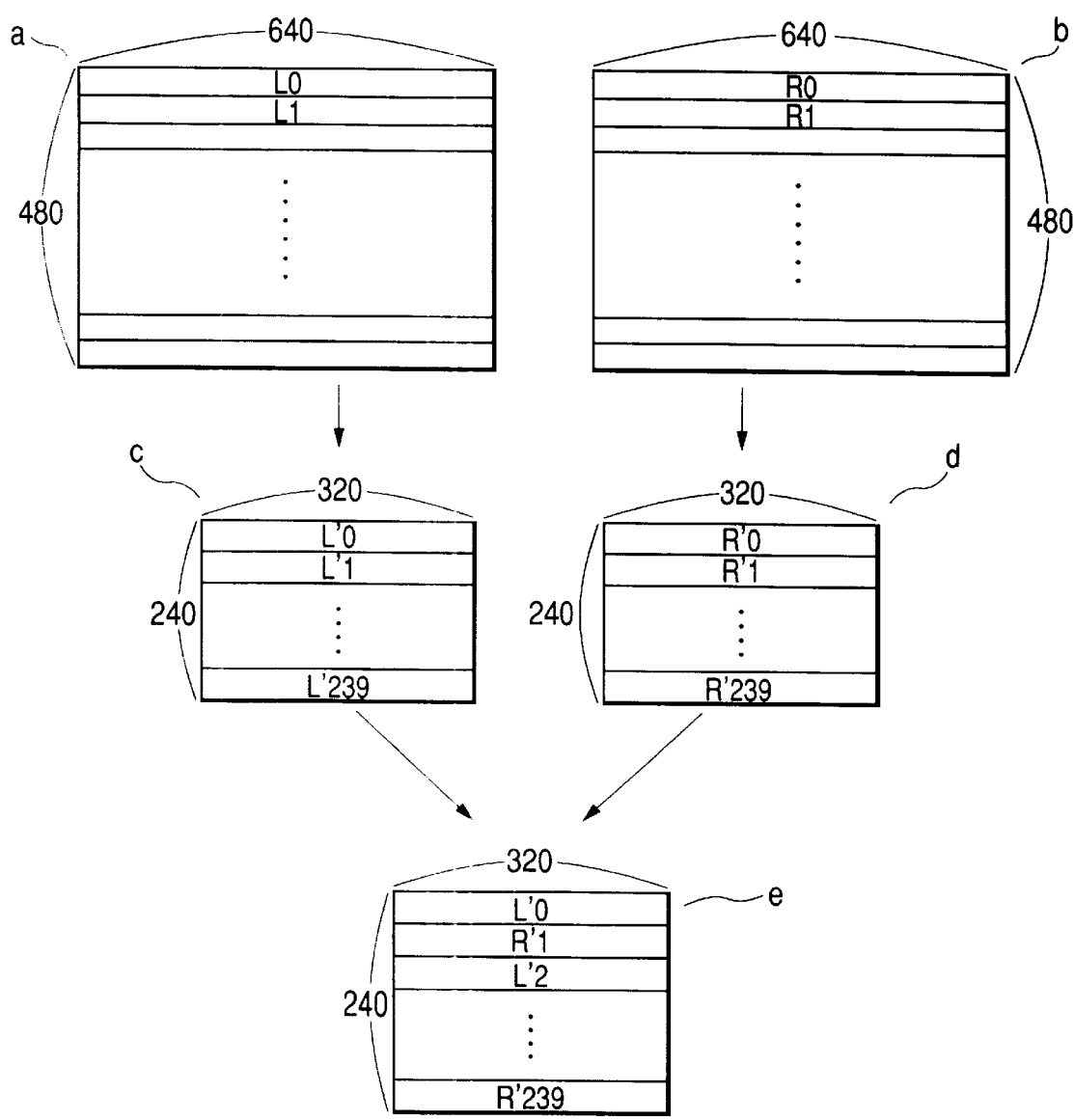
FIG. 4 is a view showing the process of image synthesis by a signal processing circuit.
Figure 7:
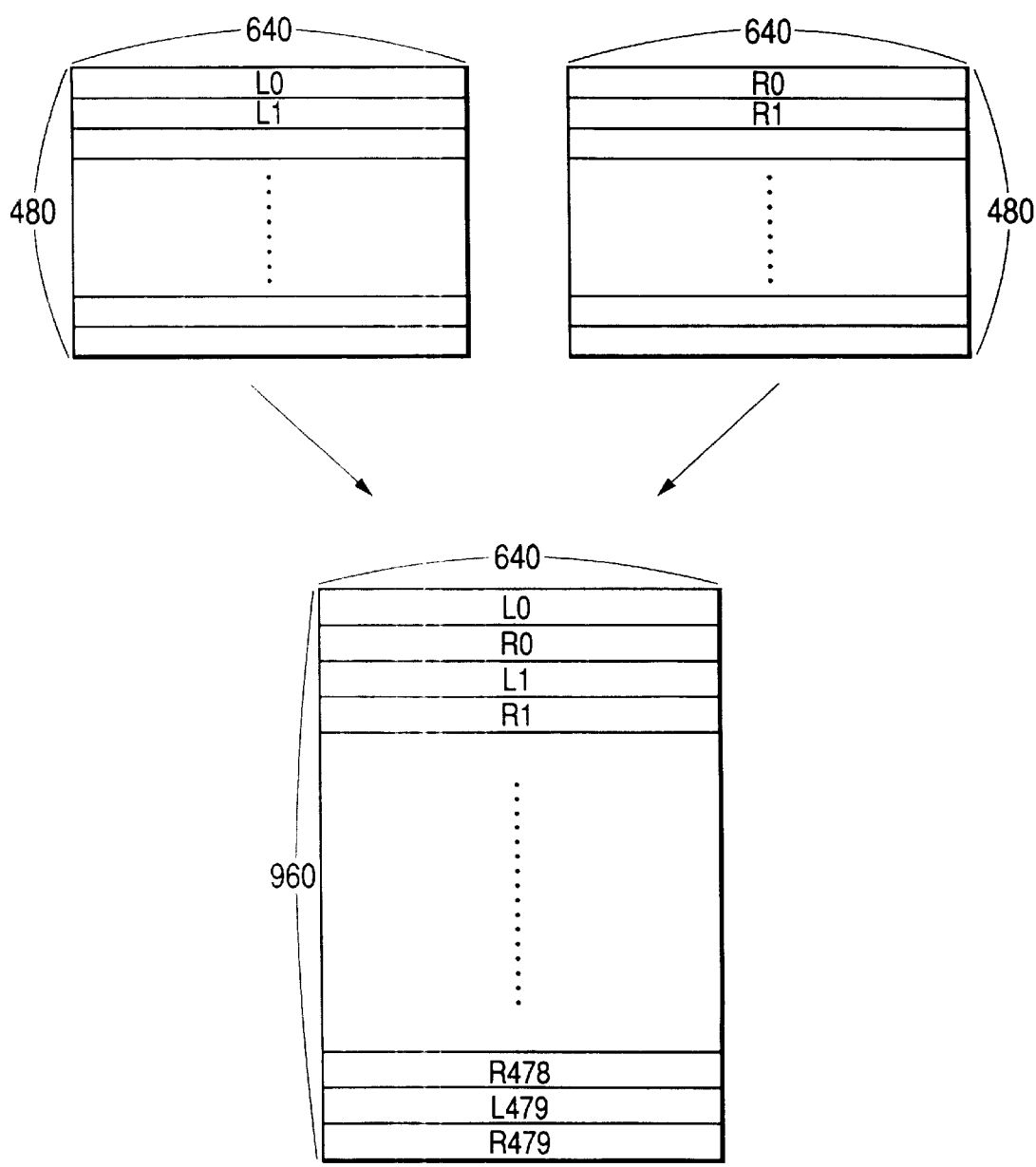
FIG. 7 is a schematic view showing another example of image synthesis by the signal processing circuit.

FIG. 4 schematically shows the image synthesis by the signal processing circuit 27. The left-side image subjected to the color conversion in the color signal process circuit 26a has 640×480 effective pixels (lines L0–L479) as shown by a in FIG. 4, while the right-side image subjected to the color conversion in the color signal process circuit 26b has 640×480 effective pixels (lines R0–R479) as shown by b in FIG. 4. In the present embodiment, the left-side image a and the right-side image b are stored as image data in the process memories 31a, 31b through the image processing circuit 27, and are also subjected, in the signal processing circuit 27, to the following image compression.

At first the left-side image a and the right-side image b are converted, according to the display size of the LCD 30, to compressed images, c, d, for example by compression to ½ in the vertical and horizontal directions to 320×240 pixels (lines L'0–L'239 and R'0–R'239). Such image conversion can be achieved by a simple thinning-out or interpolation. Then these compressed images, c, d are alternately synthesized by every line in the order of [L'0, R'1, L'2, ..., R'237, L'238, R'239] to generate a synthesized image e, which is then written into the VRAM 28.

After the synthesized image e representing the left and right parallax images is written in the VRAM 28, it is displayed by the LCD control unit 29 on the LCD 30 (display device 4), with the left and right images alternating in every line. As the camera control unit 40 selects the stereoscopic image pickup mode, the LCD control unit 29 applies an electric field to the PDLC 9 at the above-mentioned display, whereby the photographer can stereoscopically observe, on the LCD 30, the images picked up by the image pickup optical systems 2, 3, and can observe such stereoscopic image while making the image pickup operation.

In the following, there will be explained the recording of the picked-up images. Such recording operation is initiated by an input operation for starting the image recording by the photographer on the camera control unit 40, and the MPU 36 executes the following operations in order to store the image data, contained in the process memories 31a, 31b in the recording medium 35.

In response to the input operation by the photographer for starting the image recording, a corresponding signal is sent from the camera control unit 40 to the MPU 36. The MPU 36 at first reads the image data in the process memories 31a, 31b, a line at a time, through the signal processing circuit 27 and executes interlaced synthesis, and once stores the interlace synthesized image in the work memory 37. It then transmits the interlaced synthesized image from the work memory 37 to the compression/expansion circuit 32, which executes a known compression process on such transmitted image. After the compression process, the MPU 36 again stores the compressed image data in the work memory 37.

When the interlaced synthesized image (compressed data), based on the left and right images stored in the process memories 31a, 31b, is contained in the work memory 37, the MPU 36 stores such interlaced synthesized image in the recording medium 35 through the memory interface 34. In this data storage the memory interface 34 stores the image signals, stored in the process memories 31a, 31b, as files in a digital format in an empty area of the recording medium 35 and executes a registration in a file management area. The left- and right-side images are registered as a pair, for example with respective file names "s001L.jpg" and "s001R.jpg" and identifying information for identifying such pair is simultaneously registered in the file management area.

In the following there will be explained the reproduction of the recorded image. Such reproducing operation is initiated by an input operation for starting the image reproduction by the photographer on the camera control unit 40, and the MPU 36 executes the following operations in order to display the image data, stored on the recording medium 35, on the LCD 30.

In response to the input operation of the photographer for initiating the reproduction of the recorded image, the MPU 36 reads, through the memory interface 34, the registration data of the files stored in the recording medium 35. In this data readout, the memory interface 34 investigates the management area of the recording medium 34 and sends the registration data of all the files to the MPU 36.

Among thus transmitted registration data of all the files, the MPU 36 selects files which can be reproduced as a stereoscopic image, and sends a list of thus selected files, as display data of an arbitrary display format, to the signal processing circuit 27.

Receiving the list of such file name data, the signal processing circuit 27 writes such list in the VRAM 28 and also is displayed by the LCD control unit 29 on the LCD 30.

Then the photographer selects a file to be reproduced, from the thus displayed list of file name data, and executes an input operation, on the camera control unit 40, in order to obtain the display corresponding to the thus selected file. In response, a corresponding signal is transmitted from the camera control unit 40 to the MPU 36, which in response reads the data of the selected file from the recording medium 35 through the memory interface 34 and transfers the read file data to the work memory 37.

The file data transferred to the work memory 37 is then transferred to the compression/expansion circuit 32 for an expansion process, then separated into left and right image data and respectively transferred to the process memories 31a, 31b. The image data transferred to the process memories 31a, 31b is subjected, in the signal processing circuit 27, to a compression process for matching with the display size of the LCD 30, then subjected to an image synthesis process and written into the VRAM 28. The content in the VRAM 28 is displayed by the LCD control unit 29 on the LCD 30 in a similar manner as in the stereoscopic display explained before.

(2) Panoramic image pickup mode

In the panoramic image pickup mode, the arrangement of the image pickup optical systems 2, 3 is different from that in the stereoscopic image pickup mode. More specifically, the image pickup optical system 2, 3 are arranged so as to pick up two mutually overlapping images the left and the right side.

When the photographer sets the panoramic image pickup mode and instructs an image recording or reproducing operation on the camera control unit 40, signals corresponding to such input operations are transmitted from the camera control unit 40 to the MPU 36, which in response controls various units.

At first there will be explained the panoramic display of the picked-up images.

Up to the entry of the two images, picked up by the image pickup optical systems 2, 3 into the respective color processing circuits 26a, 26b, the signal processing is conducted in the same manner as in the stereoscopic display in the foregoing stereoscopic image pickup mode.

Upon receiving the left and right images subjected to color conversion, the signal processing circuit 27 stores the image data of the left and right images after color conversion respectively in the process memories 31a, 31b, then synthesizes a panoramic image by laterally arranging the left and right images in such a manner that the overlapping portions thereof mutually match, converts such panoramic image so as to match the pixel size of the LCD 30 and writes the thus converted image in the VRAM 28. In such conversion for matching the pixel size of the LCD 30 there is obtained an image reduced in the vertical direction. For example, if the overlapping amount is zero, each of the left and right images is reduced to a size of 160×120 pixels and these images are synthesized by side-by-side arrangement to obtain a panoramic image of 320×120 pixels. The overlapping amount of the left and right images at the synthesis of the panoramic image is detected by the signal processing circuit 27.

When the panoramic image, based on the left and right images, is stored in the VRAM 28 as explained above, it is displayed by the LCD control unit 29 on the LCD 30 (display device 4). As the camera control unit 40 selects the panoramic image pickup mode, the LCD control unit 29 does not apply the electric field to the PDLC 9 at the above-mentioned display. In the absence of electric field on the PDLC 9, the light given directionality prior to entry into the PDLC 9 is scattered by the liquid crystal molecules at the passing therein, thereby illuminating the pixel display unit 10 with disrupted directionality. Consequently the photographer observes the image displayed on the LCD 30, not as a stereoscopic image but as a two-dimensional panoramic image, and such panoramic image can be observed even in the course of image pickup operation.

The recording and reproduction of the images in the panoramic image pickup mode will not be explained in particular since they are substantially the same as those in the stereoscopic image pickup mode, except that the signal processing circuit 27 executes a process of obtaining a panoramic image, instead of the process of obtaining the interlaced synthesized image.

In the above-explained embodiment, the interlaced synthesis is executed by picking up the odd-numbered lines of the left-side image as those of the synthesized image and the even-numbered lines of the right-side image as those of the synthesized image, but the interlaced synthesis can also be achieved in various other combinations. For example, as shown in Example 1 in FIG. 5, interlaced synthesis may be achieved by picking up the odd-numbered lines of the left-side image as those of the synthesized image and the odd-numbered lines of the right-side image as the even-numbered lines of the synthesized image. There may also be employed other interlaced syntheses, schemes such as synthesis schemes picking up the even-numbered lines of the left image as the odd-numbered lines of the synthesized image and the even-numbered lines of the right image as the even-numbered lines of the synthesized image (Example 2 in FIG. 5), a synthesis schemes picking up the odd-numbered lines of the left image as the even-numbered lines of the synthesized image and the even-numbered lines of the right image as the odd-numbered lines of the synthesized image (Example 3 in FIG. 5), or a synthesis scheme picking up the odd-numbered lines of the left image as the even-numbered lines of the synthesized image and the odd-numbered lines of the right image as the odd-numbered lines of the synthesized image (Example 4 in FIG. 5). However, in case the right image becomes the odd-numbered lines of the synthesized image (Examples 3, 4 and 5 in FIG. 5), the checker-patterned apertures of the aperture mask 6 are inverted in order that the right image can be observed by the right eye of the observer.

In the above-explained compound eye camera, in combination with the image display, stereo sound can be reproduced by providing microphones at left and at right, in combination with the image pickup optical systems 2, 3.

In the foregoing first embodiment, the images picked up by the CCD's 20a, 20b are accumulated in the frame accumulation mode for executing accumulation in the unit of a frame, but a second embodiment instead employs a field accumulation mode for executing accumulation in the unit of a field (a frame being constituted by two fields). FIG. 6 schematically shows image synthesis in the signal processing circuit 27 in the case of a field accumulation mode.

In the field accumulation mode, among the parallax images subjected to color conversion by the color signal processing circuits, the left image (a) shown in FIG. 6 has 640×240 effective pixels (lines L0–L239), while the right image (b) shown in FIG. 6 has 640×240 effective pixels (lines R0–R239). In the present embodiment, the left image (a) and the right image (b) are stored as image data in the process memories 31a, 31b through the signal processing circuit 27 as in the foregoing frame accumulation mode, and also are subjected to the following image compression in the signal processing circuit 27.

At first the left image (a) and the right image (b) are converted, according to the display size of the LCD 30, to compressed images (c), (d), by compression to ½ in the horizontal direction to 320×240 pixels (lines L'0–L'239 and R'0–R'239). Such image conversion can be achieved by a simple thinning-out or interpolation. Then these compressed images (c), (d) are alternately synthesized by every line in the order of [L'0, R'1, L'2, . . . , R'237, L'238, R'239] to generate a synthesized image (e), which is then written into the VRAM 28. The stereoscopic display based on the synthesized image e stored in the VRAM 28 is conducted in the same manner as in the foregoing frame accumulation mode.

In the compound eye camera of the foregoing embodiments, it is also possible, as a third embodiment, to double the capacity of the VRAM 28 and to achieve the interlaced synthesis in the signal processing circuit 27 by alternate synthesis of every line of the left and right images in the order of [L0, R0, L1, R1, L2, R2, . . . , L479, R479]. In such third embodiment, the synthesized image has a doubled size of 640×960 pixels, in comparison with each of the picked-up images having a size of 640×480 pixels.

In the following there will be explained an image display system, which constitutes a fourth embodiment and in which the compound eye camera of the foregoing embodiments is connected to a personal computer. FIG. 8 shows the configuration of such image display system.

As shown in FIG. 8, the image display system is composed of a compound eye camera 1 integrally including the left and right image pickup optical systems 2, 3 and the display device 4 capable of stereoscopic display, and a personal computer, consisting of a main body 13 with a CPU and a memory device and a stereoscopic display 12 and connected to the compound eye camera 1. The compound eye camera 1 has a configuration the same as that shown in FIG. 1.

The stereoscopic display 12 has a configuration the same as that of the display device 4 of the compound eye camera 1, and is composed of a rear light source 5' constituting the illuminating light source, an aperture mask 6' provided with a mask pattern with checker patterned apertures for transmitting light, lenticular lenses 7', 8', a PDLC 9', a pixel display unit 10' composed of a liquid crystal layer, etc., and a glass substrate 11' which are superposed in succession.

In this image pickup-displaying system, an interlaced synthesized image or a panoramic image formed in the compound eye camera 1 is transferred to the main body 13 of the personal computer and the transferred data is displayed by the main body 13 on the stereoscopic display 12. Also on this stereoscopic display 12, the display is made with the rear barrier lenticular system employed in the display device 4 of the compound eye camera 1 explained before, and a stereoscopic image or a panoramic image is displayed according to the selected mode. More specifically, in the case of display of a stereoscopic image, an electric field is applied to the PDLC 9', whereby the image synthesized from the horizontal stripes alternating in the vertical direction is displayed, while, in the case of display of a panoramic image, the electric field is not applied to the PDLC 9' whereby the transferred panoramic image is displayed.

Figure 9B:
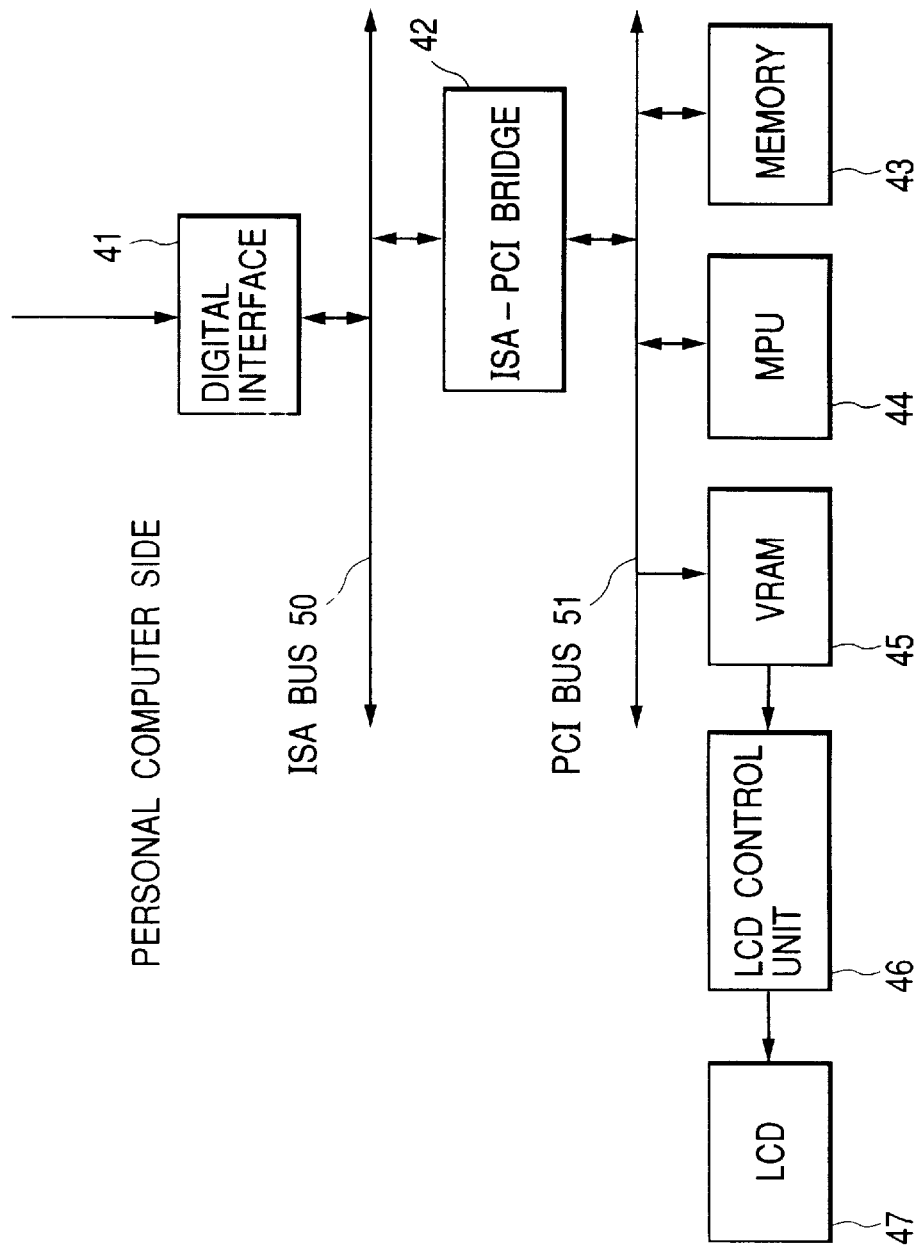
FIG. 9, which is composed of FIGS. 9A and 9B, is a block diagram showing the specific configuration of the stereoscopic image display system shown in FIG. 8.
Figures 11A, 11B:
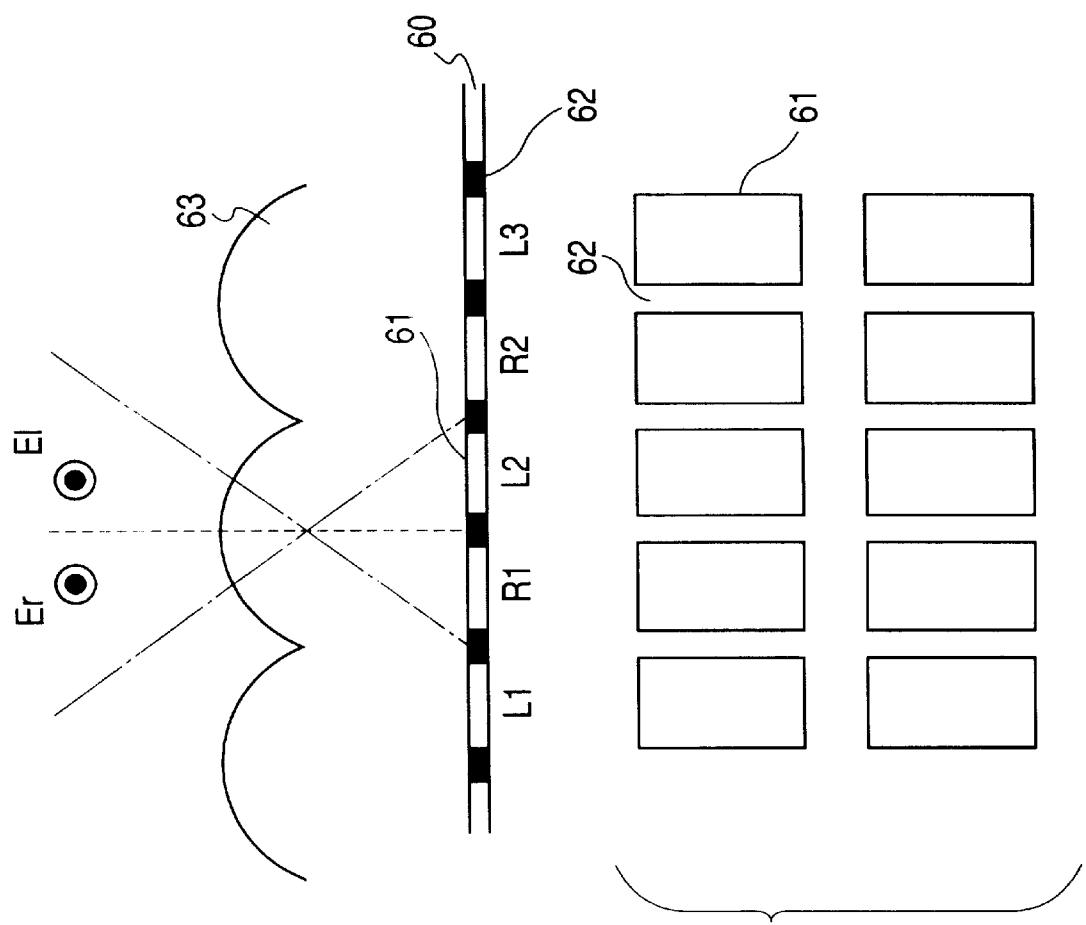
FIGS. 11A and 11B are views showing a stereoscopic display system with a lenticular lens, and are respectively a cross-sectional view of a pixel display unit of the liquid crystal display as seen from above the observer, and a view showing the filter configuration of the pixel display unit.
Figure 12A:
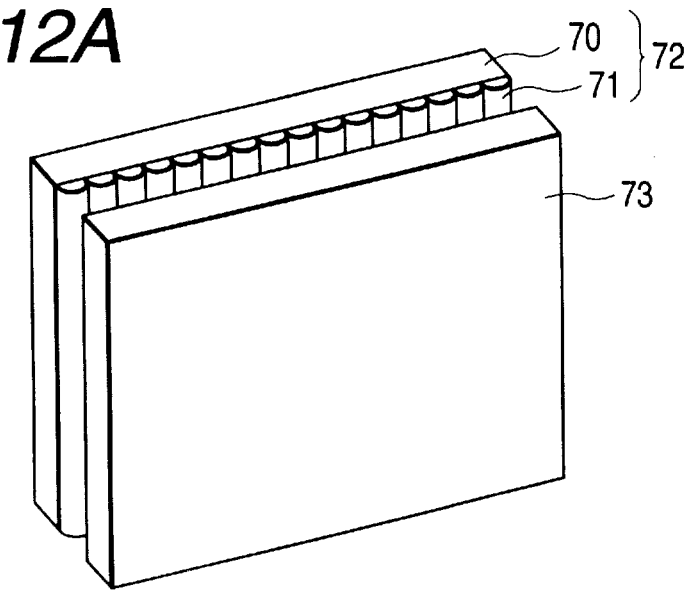
FIGS. 12A, 12B and 12C are views showing the basic configuration of a stereoscopic image display apparatus disclosed in the Japanese Patent Application Laid-Open No. 7-234459.
Figure 12B:
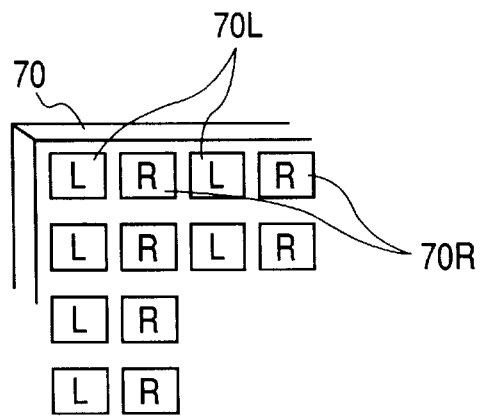
Figure 12C:
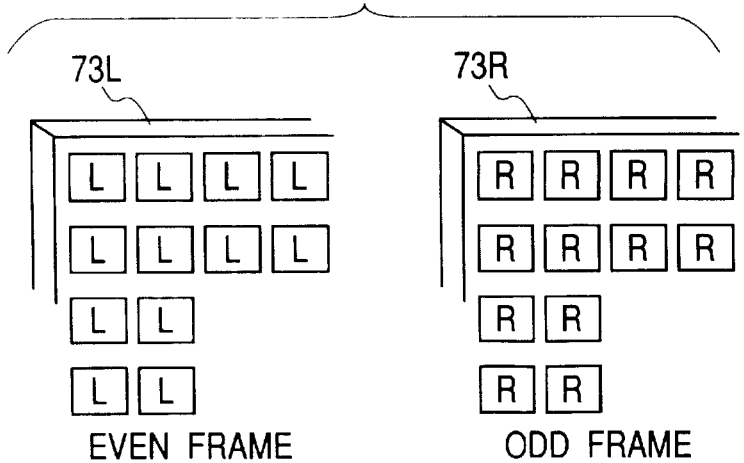

In the following there will be given a detailed explanation on the specific configuration of this stereoscopic image display system. FIGS. 9A and 9B are block diagrams showing the detailed configuration of the stereoscopic image display system shown in FIG. 8.

In FIGS. 9A and 9B, the configuration of the compound eye camera 1 is similar to that shown in FIG. 3 and will not therefore be explained in detail. A digital interface (USB) 33 of the compound eye camera 1 is connected, through an interface cable, with a digital interface (USB) 41 of the personal computer.

The digital interface 41 is connected to an ISA bus 50, which is connected to a PCI bus 51 through an ISA-PCI bridge circuit 42. A memory 43, an MPU 44 and a VRAM 45 are respectively connected to the PCI bus 51.

An LCD 47, constituting the stereoscopic display 12 of the personal computer shown in FIG. 8, is controlled by an LCD control unit 46. The VRAM 45 is a display memory similar to the VRAM 28 of the compound eye camera 1. It has a capacity sufficient for image display and the content therein is displayed on the LCD 47 under the control by the LCD control unit 46. The display control of the LCD control unit 46 provides a display of a stereoscopic image or a panoramic image according to the selected mode, as in the display control by the LCD control unit 29 of the aforementioned compound eye camera 1.

In the following there will be explained the display control in the present image display system. The following explanation will only be given to the display control in the personal computer, as the image pickup, recording, reproduction and display of the stereoscopic and panoramic images in the compound eye camera 1 are same as those explained before and will not, therefore, be explained again.

In the aforementioned stereoscopic image pickup mode, the work memory 37 of the compound eye camera 1 contains the interlaced synthesized image, and such synthesized image is transmitted, under the control of the MPU 36, to the personal computer through the digital interface 33.

In the personal computer, the interfaced synthesized image transmitted from the compound eye camera 1 is received through the digital interface 41, and is recorded in the memory 43 through the ISA-PCI bridge circuit 42. The interlaced synthesized image recorded in the memory 43 is transferred to the VRAM 45 under the control by the MPU 44, and, in this transfer, there is executed a conversion process for matching the interlaced synthesized image with the display size of the stereoscopic display 12. If the interlaced synthesized image to be transferred is subjected, in the compound eye camera 1, to a compression process, such image is subjected, in the personal computer, to an expansion process prior to the matching with the display size.

When the interlaced synthesized image is transferred to the VRAM 45, the LCD 46 displays such interlaced synthesized image in the VRAM 45 on the stereoscopic display 12, under a control similar to the aforementioned stereoscopic display control in the display device 4 of the compound eye camera 1. In this manner, the photographer can fetch the images, picked up by the compound eye camera 1, into the personal computer and can stereoscopically observe the images on the stereoscopic display 12.

In the following there will be explained a case of fetching the image data, recorded on the recording medium 36 of the compound eye camera 1, into the personal computer and observing such data on the stereoscopic display 12.

In response to an input operation by the photographer to fetch the recorded image into the personal computer and to display the image therein, the MPU 36 causes the memory interface 34 to execute the readout of the file registration data stored in the recording medium 35. In this data readout operation, the memory interface 34 at first investigates the management area of the recording medium 35 and sends the registration data of all the files to the MPU 36.

Among the registration data of all the files sent from the memory interface 34, the MPU 36 selects files that can be reproduced as a stereoscopic image and sends a list the thus selected files, as display data of an arbitrary display format, to the signal processing circuit 27.

Receiving the list of such file name data, the signal processing circuit 27 writes such list in the VRAM 28 and also is displayed by the LCD control unit 29 on the LCD 30.

Then the photographer selects a file to be reproduced, from the thus displayed list of file name data, and executes an input operation, on the camera control unit 40, in order to obtain a display corresponding the thus selected file. In response, the MPU 36 reads the data of the selected file from the recording medium 35 through the memory interface 34 and transfers the read file data to the work memory 37. The file data transferred to the work memory 37 is then transferred to the personal computer through the digital interface 33 under the control by the MPU 36 and is stereoscopically displayed under a control similar to that in the aforementioned stereoscopic display.

In the following there will be explained a case of transferring a panoramic image picked up by the compound eye camera 1 to the personal computer and displaying such image therein.

In the panoramic image pickup mode, the work memory 37 of the compound eye camera 1 contains a panoramic image synthesized from the left and right images, and thus contained synthesized image is transmitted, under the control of the MPU 36, to the personal computer through the digital interface 33. The synthesized panoramic image transmitted from the compound eye camera 1 is received by the personal computer through the digital interface 41, then recorded in the memory 43 through the ISA-PCI bridge circuit 42 and further transferred to the VRAM 45 under the control by the MPU 44. In this transfer, there is executed a conversion process for matching the synthesized panoramic image with the display size of the stereoscopic display 12.

When the synthesized panoramic image is transferred to the VRAM 45, the LCD control unit 46 displays such synthesized panoramic image in the VRAM 45 on the stereoscopic display 12, under a control similar to the aforementioned panoramic display control in the display device 4 of the compound eye camera 1. In this manner, the photographer can fetch the images, picked up by the compound eye camera 1, into the personal computer and can observe a panoramic image on the stereoscopic display 12.

As explained in the foregoing, the image display system of the present embodiment makes it possible to observe the image (stereoscopic or panoramic image), picked up by the compound eye camera 1, on the spot by the display device 4 provided in the compound eye camera 1 or to fetch such image into the personal computer and to observe such image on the stereoscopic display 12.

In the above-explained image pickup-displaying system, an image subjected to interlaced synthesis in the compound eye camera 1 is transferred to the personal computer, but, in a fifth embodiment, the interlaced synthesis is executed in an adapter. FIGS. 10A and 10B show the configuration of such fifth embodiment.

The configuration shown in FIGS. 10A and 10B the same as that shown in FIGS. 9A and 9B, except for the addition of a 3D adapter. In FIGS. 10A and 10B, components the same as those in FIGS. 9A and 9B are represented by the same numbers.

A 3D adapter 80 is composed of a digital interface (USB) 81 connected through interface cables with the digital interface (USB) 33 of the compound eye camera 1 and the digital interface (USB) 41 of the personal computer, a memory 82 for storing the image data to be received through the digital interface 81, and an image synthesis circuit 83 for synthesizing an interlaced image or a panoramic image from the image data stored in the memory 82.

In the image recording-displaying system of the present embodiment, in response to an input operation made by the photographer on the camera control unit 40 to initiate an image recording operation, the MPU 36 at first transmits the image data from the process memory 31a, without interlaced synthesis, to the 3D adapter 80 through the digital interface 33. The image data transmitted (without interlaced synthesis) from the compound eye camera 1 is received by the 3D adapter 80 through the digital interface 81 and is stored in the memory 82. Subsequently, the MPU 36 transmits the image data from the process memory 31b, without interlaced synthesis, to the 3D adapter 80 through the digital interface 33. The transmitted image data is received by the 3D adapter 80 through the digital interface 81 and is stored in the memory 82. The image data stored in the memory 82 is transferred to the image synthesis circuit 83, then subjected to interlaced synthesis therein and again stored in the memory 82. The interlaced synthesized image in the memory is transmitted through the digital interface 81 to the personal computer.

In the personal computer, the image data (interlaced synthesized image) transmitted from the 3D adapter 80 is received through the digital interface 81 and is stereoscopically displayed in the same manner as in the foregoing fourth embodiment.

In the case of the panoramic image pickup mode, mutually overlapping left and right image data is transmitted from the process memories 31a, 31b to the memory 82 of the 3D adapter 80 and synthesized into a panoramic image in the image synthesis circuit 83. In the personal computer, the image data (panoramic image) transmitted from the 3D adapter 80 is received through the digital interface 81 and displayed as a panoramic image in the same manner as in the foregoing fourth embodiment.

As explained in the foregoing, as the compound eye camera itself is provided with display means capable of stereoscopic display, it is rendered possible to confirm the stereoscopic image in the course of the image pickup operation, thereby effecting various adjustments such as the adjustment of parallax.

Also, the display means displays an image divided into stripes by every line or by every plural lines and provides different directionalities respectively to the display of the stripe images in the odd-numbered lines and to the display of the stripe images in the even-numbered lines, thereby providing a stereoscopic display in a predetermined observing position. Consequently two images, namely a left-eye image and a right-eye image with a parallax, are simultaneously displayed and the display frame rate for the stereoscopic display can be reduced to a half of that in the conventional system for displaying the parallax images on a time-shared basis, so that a high-speed display is not required.

Also, in case the display means is constructed so that the light beam from a light source illuminates the liquid crystal display means through a lenticular lens, the observer observes the light beam illuminating the liquid crystal display means and such display means lacks the lens employed in front in the conventional technology. For this reason, in the stereoscopic display, there can be avoided drawbacks such as reflection of the lens surface deteriorating the image quality or the formation of Moire fringes by the black matrix of the liquid crystal display.

Furthermore, the compound eye camera of the present embodiment, being provided therein with a digital interface to be connected with an external equipment through an interface cable and being adapted to transmit, through the digital interface, an image synthesized by dividing two picked-up images with a parallax into horizontal stripes and arranging such stripe-shaped images alternately by every line, can be connected with a personal computer through an interface cable and allows the picked-up stereoscopic image to be fetched into the personal computer. In the present embodiment, the personal computer is provided with display means capable of stereoscopic display of the fetched synthesized image, namely such display means as to provide different directionalities respectively to the display of the stripe images in the odd-numbered lines and that of the stripe images in the even-numbered lines, thereby providing a stereoscopic display in a predetermined observing position, so that the fetched synthesized image can be stereoscopically displayed on the personal computer.

Thus, according to the present invention enabling the construction of a system utilizing a personal computer, the user is not required to reconstruct the system in the case of fetching and displaying the stereoscopic image, picked up with the compound eye camera, in a personal computer.

The display control means is means for effecting signal processing in the signal processing circuit of the following embodiment and display control in the LCD control unit based on the result of such signal processing. Also the image synthesis means is means for effecting signal processing in the signal processing circuit.

The foregoing embodiments provide an advantage of obtaining a satisfactory stereoscopic image in a simple manner, as it is rendered possible to confirm the stereoscopic image on the spot in the course of the image pickup operation and to execute various adjustments such as the adjustment of the parallax.

In addition there is provided an advantage of obtaining a stereoscopic image of high quality, since there can be avoided drawbacks such as the reflection of the lens surface deteriorating the image quality or the formation of Moire fringes by the black matrix of the liquid crystal display.

Also, as the display of a two-dimensional image is possible, there can be provided a compound eye camera and an image display system compatible with a two-dimensional image and a stereoscopic image.

Also, it is rendered possible to easily input the stereoscopic image into the personal computer.

In the following there will be explained a sixth embodiment of the present invention.

As a system for picking up and displaying a stereoscopic image, there is already known, for example, a compound eye camera apparatus proposed by the present applicant in the Japanese Patent Application No. 8-261207. Basically, this stereoscopic image pickup and displaying system, employing the above-mentioned compound eye camera apparatus, obtains a set of images with a parallax with plural cameras and provides the observer with a stereoscopic image by a stereoscopic image display apparatus exclusive for the system.

However, in a conventional compound eye camera apparatus, the display device for reproducing the stereoscopic image is in most cases provided with a lenticular lens in front of a liquid crystal display panel and is therefore associated with the following drawbacks.

The stereoscopic image display apparatus of this type has an advantage of not requiring exclusive spectacles, but has an extremely narrow stereoscopic viewing area, so that, in case it is used as a view finder for confirming the image in the course of an image pickup operation, stereoscopic observation becomes impossible if the positional relationship between the display apparatus and the user changes when the direction of the camera is changed.

Therefore, the present embodiment provides a compound eye camera apparatus capable of always picking up the stereoscopic image in a stable state, even in case a stereoscopic image display device with a narrow viewing area is employed as the view finder.

Also, the present embodiment provides a compound eye camera apparatus capable of always picking up the stereoscopic image in a stable state and allowing easy change of the image pickup direction, even in the case where a stereoscopic image display device with a narrow viewing area is employed as the view finder.

Still another object is to provide a compound eye camera apparatus enabling the user to easily observe the stereoscopic image.

Still another object is to provide a compound eye camera apparatus capable of displaying also a two-dimensional image, without sacrificing resolution.

Still another object is to provide a compound eye camera apparatus that can be compactly stored when an image pickup operation is not conducted.

Still another object is to provide a compound eye camera apparatus in which an image pickup direction can be immediately returned to an initial state.

The above-mentioned objects can be attained, according to the following embodiment, by a compound eye camera provided with plural image pickup lenses for condensing light from an object to form optical images on image planes, plural image pickup elements respectively provided on the image planes of the plural image pickup lenses, and image display means for displaying a stereoscopic image based on image signals obtained from the plural image pickup elements, the compound eye camera comprising a housing for supporting the image display means, wherein the plural image pickup lenses are rendered rotatable at least in the horizontal direction with respect to the housing, without change in the relative positional relationship of the optical axes thereof.

Also according to a preferred embodiment of the present invention, there is provided a compound eye camera provided with plural image pickup lenses for condensing light from an object to form optical images on image planes, plural image pickup elements respectively provided on the image planes of the plural image pickup lenses, and image display means for displaying a stereoscopic image based on image signals obtained from the plural image pickup elements, the compound eye camera comprising a housing for supporting the image display means, rotation means for rotating the plural image pickup lenses relative to the housing, and rotating operation means for instructing the amount and direction of rotation for each of the plural image pickup lenses, wherein the rotating operation means is provided in a position operable with the thumb or the index finger of the user when the user holds the housing.

In the following there will be given a detailed explanation on the sixth embodiment of the present invention.

Figure 13:
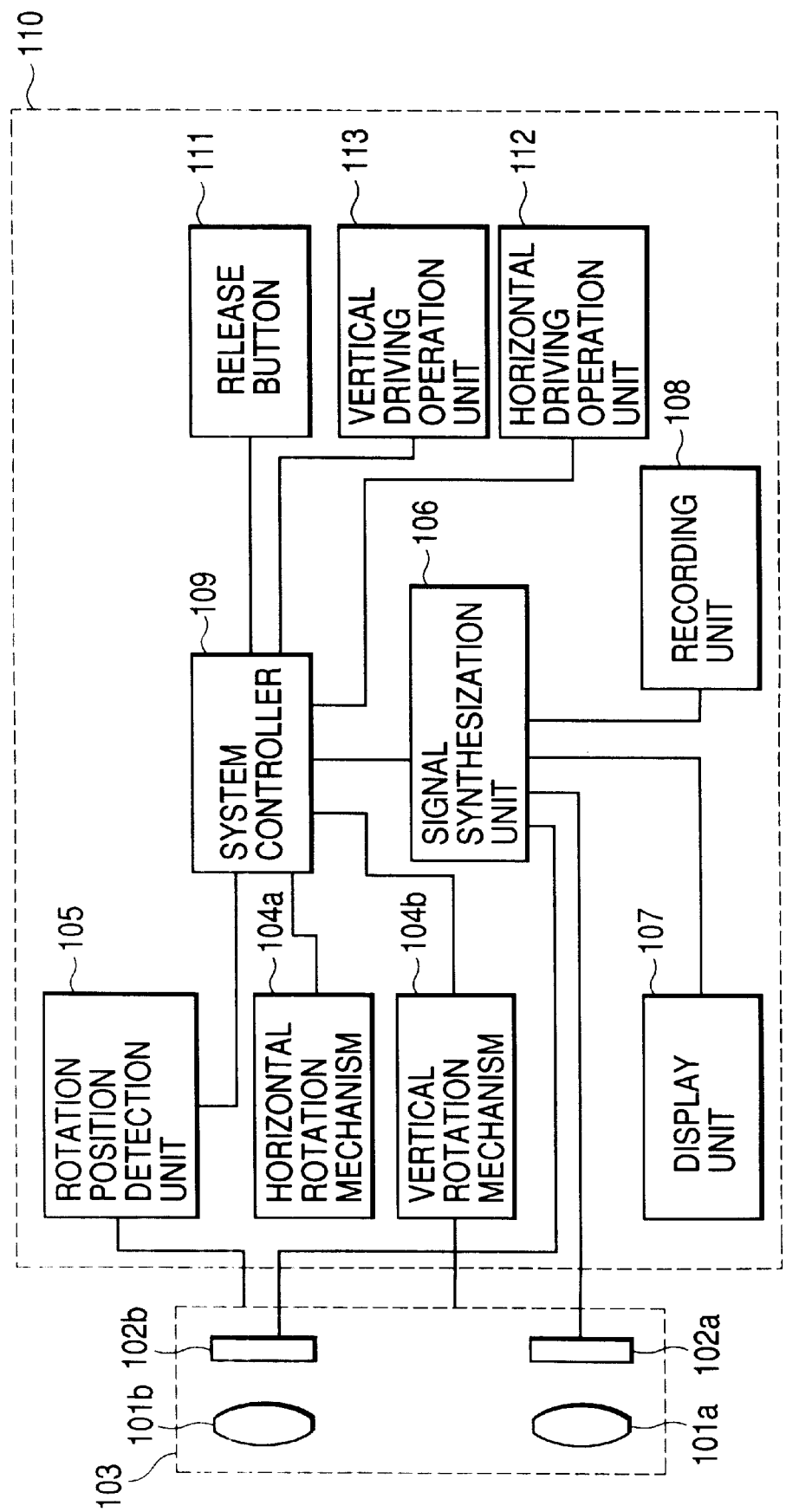
FIG. 13 is a block diagram showing the configuration of a compound eye camera apparatus constituting a sixth embodiment.

FIG. 13 is a block diagram showing the configuration of a compound eye camera apparatus of the sixth embodiment, wherein image pickup lenses 101a, 101b are provided with unshown focusing means and diaphragm adjustment means.

Image pickup elements 102a, 102b convert the optical images, focused by the image pickup lenses 101a, 101b, into electrical image signals. A camera head 103 supports the image pickup lenses 101a, 101b and the image pickup elements 102a, 102b, and is rotatably supported with respect to the main body 110 of the compound eye camera, as will be explained later.

A horizontal rotating mechanism 104a horizontally rotates the camera head 103 with respect to the main body 110 of the compound eye camera, while a vertical rotating mechanism 104b vertically rotates the camera head 103 with respect to the main body 110 of the compound eye camera. A rotary position detecting unit 105 detects the rotary position of the camera head 103 with respect to the main body 110.

A signal synthesis unit 106 generates a two-dimensional image signal or a stereo image signal, from the image signals obtained from the image pickup elements 102a, 102b. A display unit 107 serves as a view finder for displaying the image signal generated In the signal synthesis unit 106.

Figure 14:
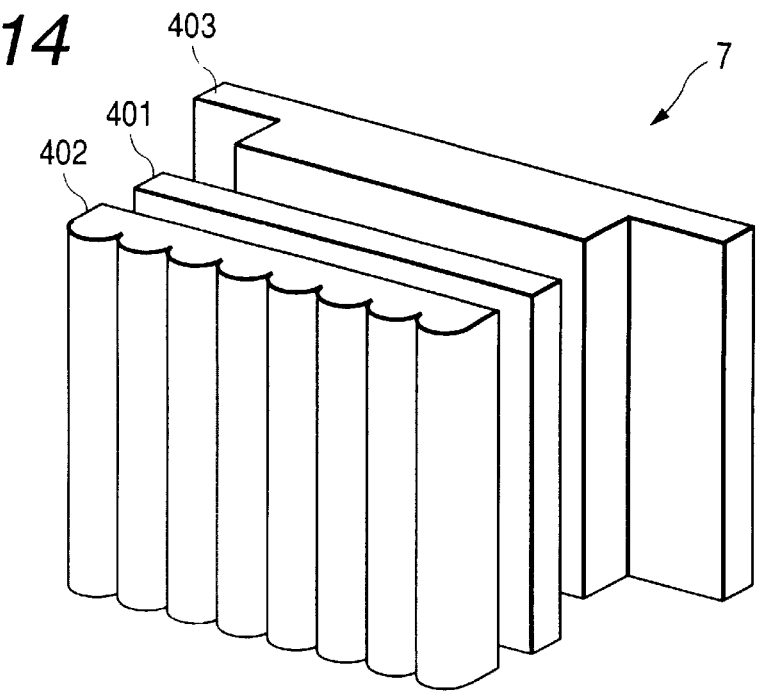
FIG. 14 is a view showing the configuration of a display unit 7.

FIG. 14 shows the configuration of the display unit 107, wherein shown are a liquid crystal panel 401 with a plurality of display pixels, a lenticular lens 402 positioned in front of the liquid crystal panel 401 and provided with a group of cylindrical lenses, and a rear light source 403 positioned behind the liquid crystal panel 401.

Figure 17:
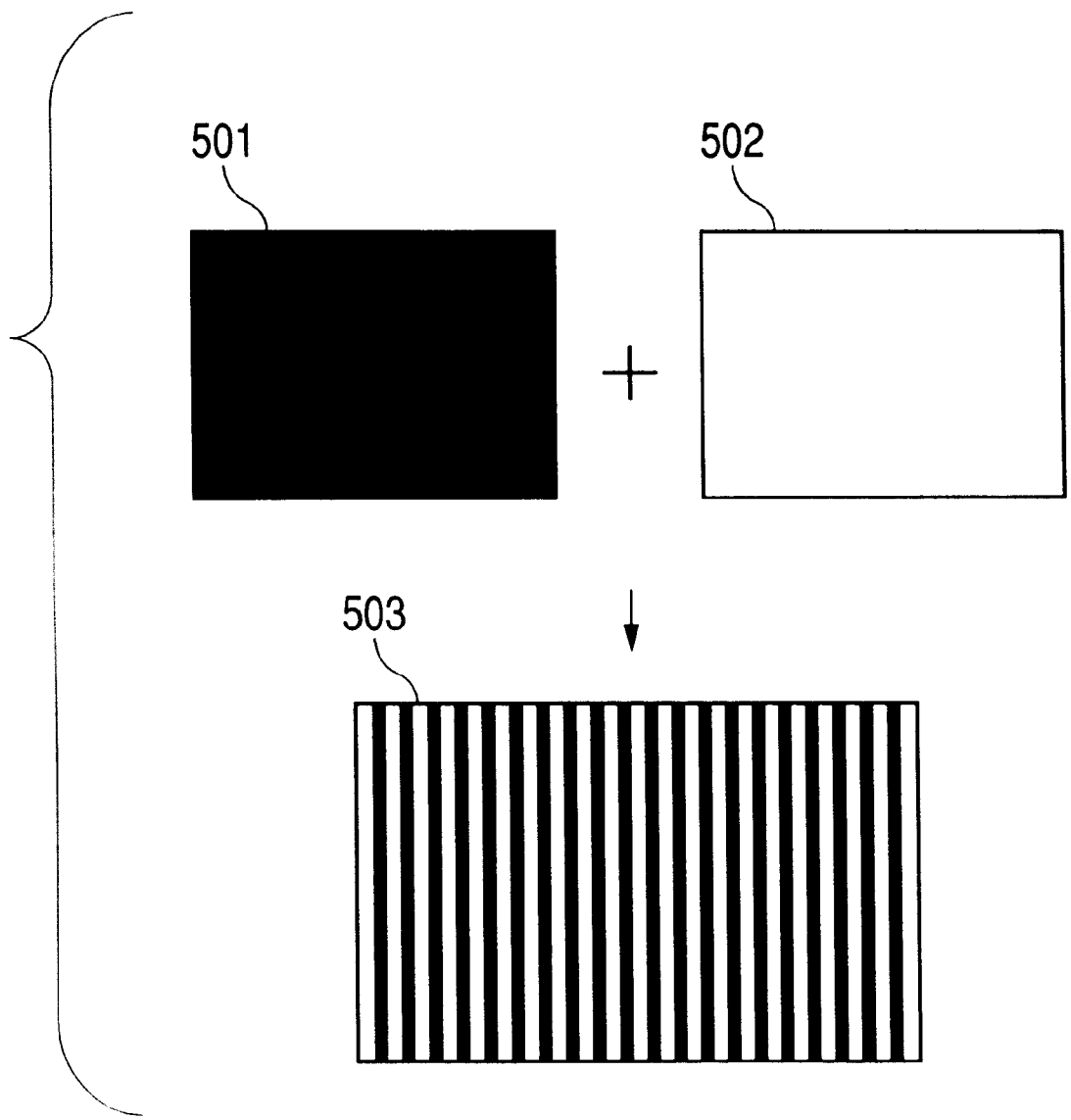
FIG. 17 is a view showing the mode of image synthesis in a signal synthesis unit 6.

As shown in FIG. 17, an image 503 is synthesized by alternate arrangement of images 501, 502 with a predetermined parallax matching the pitch of the lenticular lens 402, and the thus synthesized image 503 is displayed on the liquid crystal panel 401, whereby the display unit 107 can provide the display of a stereoscopic image. The stereoscopic image display apparatus employing such lenticular lens is already well known, for example by the Japanese Patent Application Laid-Open No. 3-65943 and will not, therefore, be explained further.

Again referring to FIG. 13, there are also shown a recording unit 108 for recording the image signal generated in the signal synthesis unit 106, a system controller 109 for controlling the compound eye camera apparatus, and a main body 110 of the compound eye camera, incorporating the display unit 107, etc.

There are further provided a shutter release button 111 for generating, upon being actuated, a signal for initiating the recording of the image signal, a horizontal drive operation unit 112 to be operated for rotating the camera head 103 in the horizontal direction by the horizontal drive mechanism 104*a* with respect to the main body 110, and a vertical drive operation unit 113 to be operated for rotating the camera head 103 in the vertical direction by the vertical drive mechanism 104*b* with respect to the main body 110.

Figure 15:
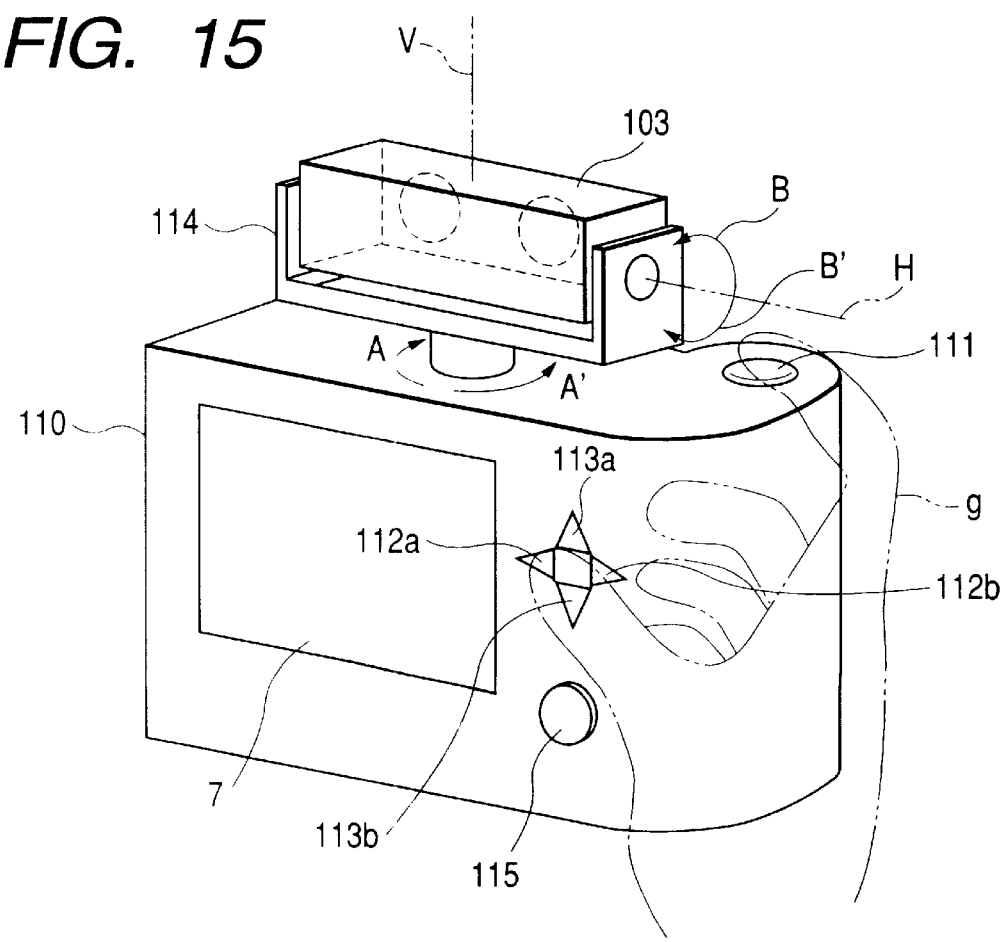
FIG. 15 is a perspective view showing the external appearance of the compound eye camera apparatus.

FIG. 15 is a perspective view showing the external appearance of the compound eye camera apparatus, wherein an arm 114 supports the camera head 103 rotatably about the horizontal axis H, and is supported by the main body 110 rotatably about the vertical axis V.

The camera head 103 is supported rotatably in horizontal directions indicated by arrows A, A' and in vertical directions indicated by arrows B, B' with respect to the main body 110 of the compound eye camera. In FIG. 15, 112*a* and 112*b* correspond to the horizontal drive operation unit 112 in FIG. 13. An operation on the horizontal drive operation unit 112*a* or 112*b* respectively rotates the camera head 103 in a direction A or A'.

Also 113*a* and 113*b* correspond to the vertical drive operation unit 113 in FIG. 13. An operation on the vertical drive operation unit 113*a* or 113*b* respectively rotates the camera head 103 in a direction B or B'.

As these horizontal drive operation units 112*a*, 112*b* and vertical drive operation units 113*a*, 113*b* are positioned so as to be operable with the thumb of a hand g of the user when the user holds the main body 110 of the compound eye camera, there will no longer be required, for example in the case of a movement of the object, an operation involving the entire body of the user such as re-directing the user himself toward the object while holding the main body 110 of the compound eye camera. Consequently the user can easily change the image pickup direction in response, for example, to movement of the object, while maintaining the display unit 107 in a position enabling stereoscopic observation. In FIG. 15, the normal line to the display plane of the display unit 107 substantially coincides with the direction of the optical axis, so that the object in a direction aimed at by the compound eye camera 110 can be picked up.

An initializing button 115 is provided for returning the positional relationship of the camera head 103 and the main body 110 of the compound eye camera to the state shown in FIG. 15.

Figure 16:
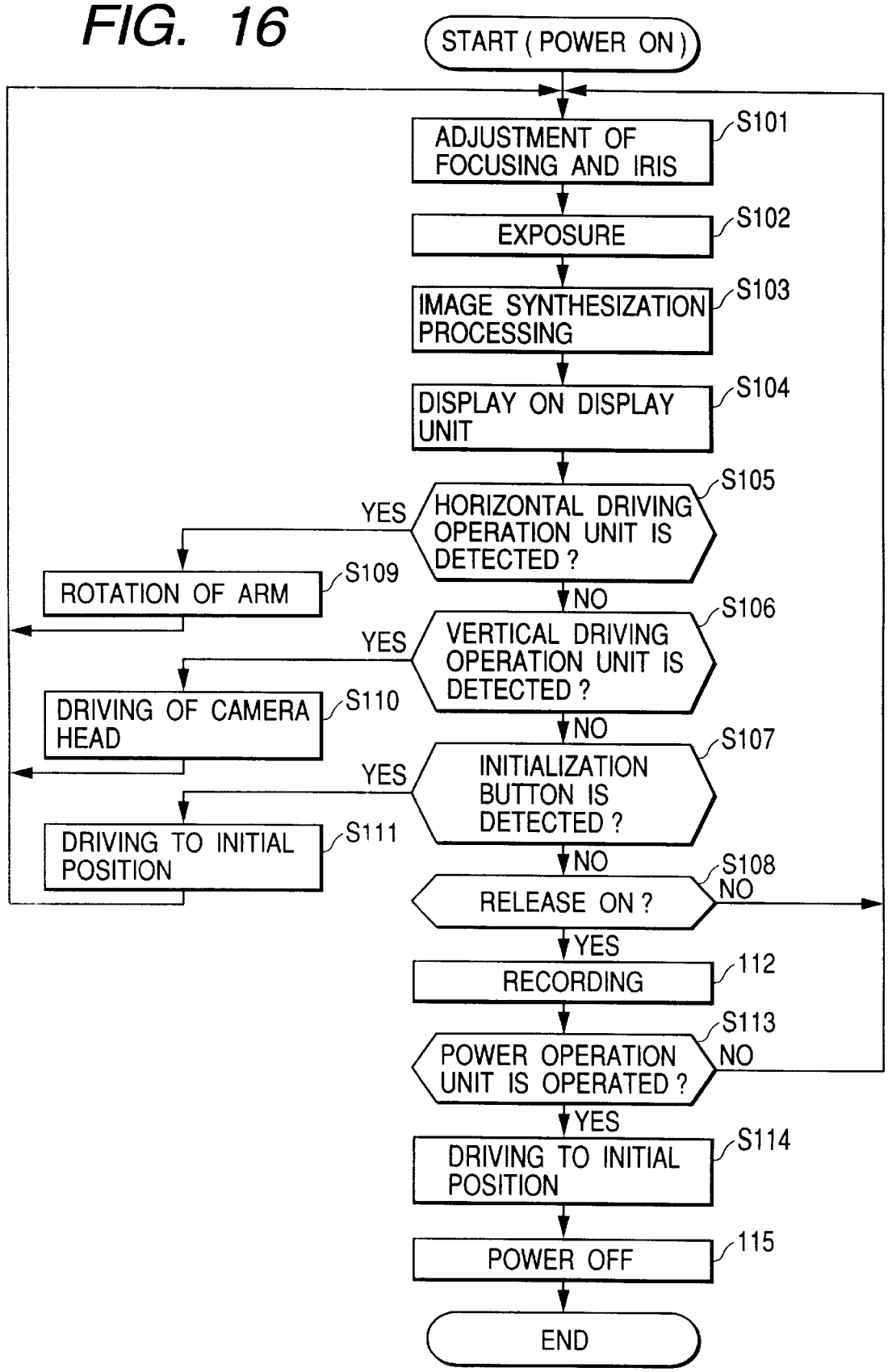
FIG. 16 is a flow chart showing the operation control sequence of the compound eye camera apparatus.

In the following there will be explained the operations of the compound eye camera apparatus of the above-explained configuration, with reference to a flow chart in FIG. 16, showing the control sequence of the compound eye camera apparatus. The control sequence is to be executed by a system controller 109, unless otherwise specified.

When a power operation unit (not shown) of the compound eye camera apparatus is operated, electric power is supplied thereto and the control sequence is initiated. At first there are executed focusing and diaphragm adjusting for the object (step S101), and the image pickup elements 102*a*, 102*b* are exposed (step S102).

Based on the image signals obtained from the image pickup elements 102*a*, 102*b*, the signal synthesis unit 106 executes image synthesis (step S103), and a synthesized image obtained therein is displayed by the display unit 107 (step S104).

FIG. 17 illustrates the image synthesis executed in the signal synthesis unit 106. In FIG. 17 there are shown a set of image signals 501, 502; and an image signal 503 synthesized from the image signals 501, 502 in the signal synthesis unit 106.

The left and right image signals 501, 502 obtained in the image pickup elements 102*a*, 102*b* are synthesized, by the signal synthesis unit 106, into an image signal 503 in which the left and right image signals are alternated in comb-tooth shape. As the pitch of such comb teeth corresponds to that of the aforementioned lenticular lens 402, the user can stereoscopically observe the object when the image signal 503 is displayed on the display unit 107.

Then it is discriminated whether the horizontal drive operation units 112*a*, 112*b* have been operated (step S105), and, if the unit 112*a* or 112*b* has been operated, the arm 114 is driven by a predetermined amount respectively in the direction A or A' by the horizontal drive mechanism 104*a* (step S109). Thereafter the sequence returns to the step S101.

If the step S105 does not detect the operation of the horizontal drive operation unit 112*a*, 112*b*, it is discriminated whether the vertical drive operation units 113*a*, 113*b* have been operated (step S106), and, if the unit 113*a* or 113*b* has been operated, the camera head 103 is driven by a predetermined amount respectively in the direction B or B' by the vertical drive mechanism 104*b* (step S110). Thereafter the sequence returns to the step S101.

If the step S106 does not detect an operation of the vertical drive operation unit 113*a*, 113*b*, it is discriminated whether the initializing button 115 has been operated (step S107), and, if operated, it is detected, by the rotary position detection unit 105, the current rotary position of the camera head 103 with respect to the main body 110 of the compound eye camera and the camera head 103 is accordingly driven by the horizontal drive mechanism 104*a* and the vertical drive mechanism 104*b* in such a manner that the positional relationship between the camera head 103 and the main body 110 reaches a state shown in FIG. 15 (initial position) (step S111). Thereafter the sequence returns to the step S101.

Then it is discriminated whether the shutter release button 111 has been turned on (step S108), and, if turned on, the image signal synthesized in the signal synthesis unit 106 is recorded, together with information, indicating that the image signal has been picked up in the compound eye camera apparatus, by the recording unit 108 (step S112). On the other hand, if the shutter release button 111 has not been turned on, the sequence returns to the step S101.

The above-explained sequence completes an image pickup operation, and the sequence from the step S101 to S112 is repeated until the unshown power operation unit is actuated (step S113).

If the step S113 detects an operation of the unrepresented power operation unit, it is detected, by the rotary position detection unit 105, the current rotary position of the camera head 103 with respect to the main body 110 of the compound eye camera and the camera head 103 is accordingly driven by the horizontal drive mechanism 104a and the vertical drive mechanism 104b in such a manner that the positional relationship between the camera head 103 and the main body 110 reaches a state shown in FIG. 15 (initial position) (step S114). Thereafter, the power source of the compound eye camera apparatus is turned off to terminate the power supply thereto (step S115).

In the compound eye camera apparatus of the present embodiment, as the camera head 103 incorporating a set of the image pickup lenses 101a, 101b and a set of image pickup elements 102a, 102b is rendered freely rotatable with respect to the main body 110 of the apparatus incorporating the display unit 107, the relative positional relationship of the optical axes of the image pickup lenses 101a, 101b can always be maintained constant. Also the camera head 103, being freely rotatable in the horizontal and vertical directions, can follow movement of the object in any direction.

Figure 18:
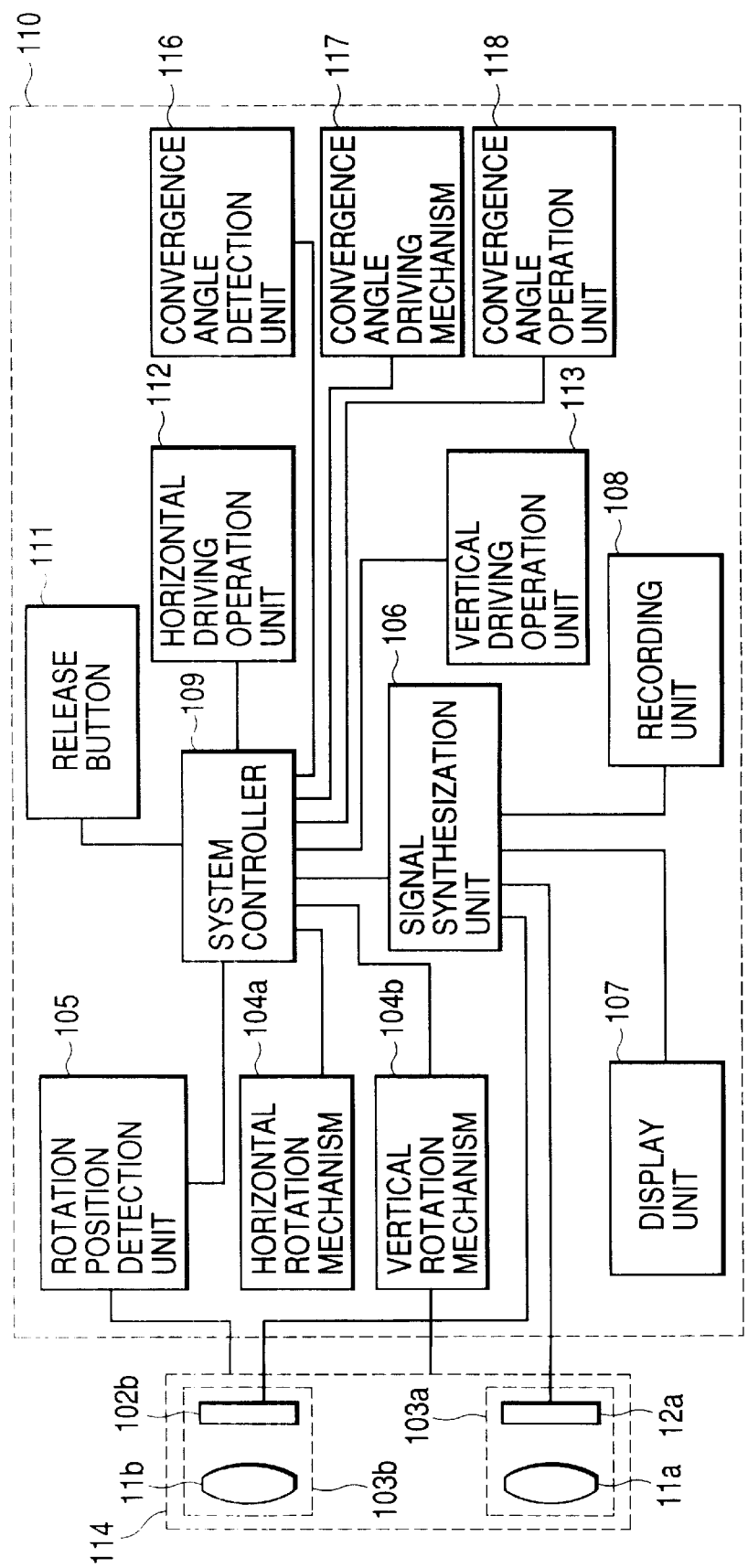
FIG. 18 is a block diagram showing the configuration of a compound eye camera apparatus constituting a seventh embodiment.
Figure 19:
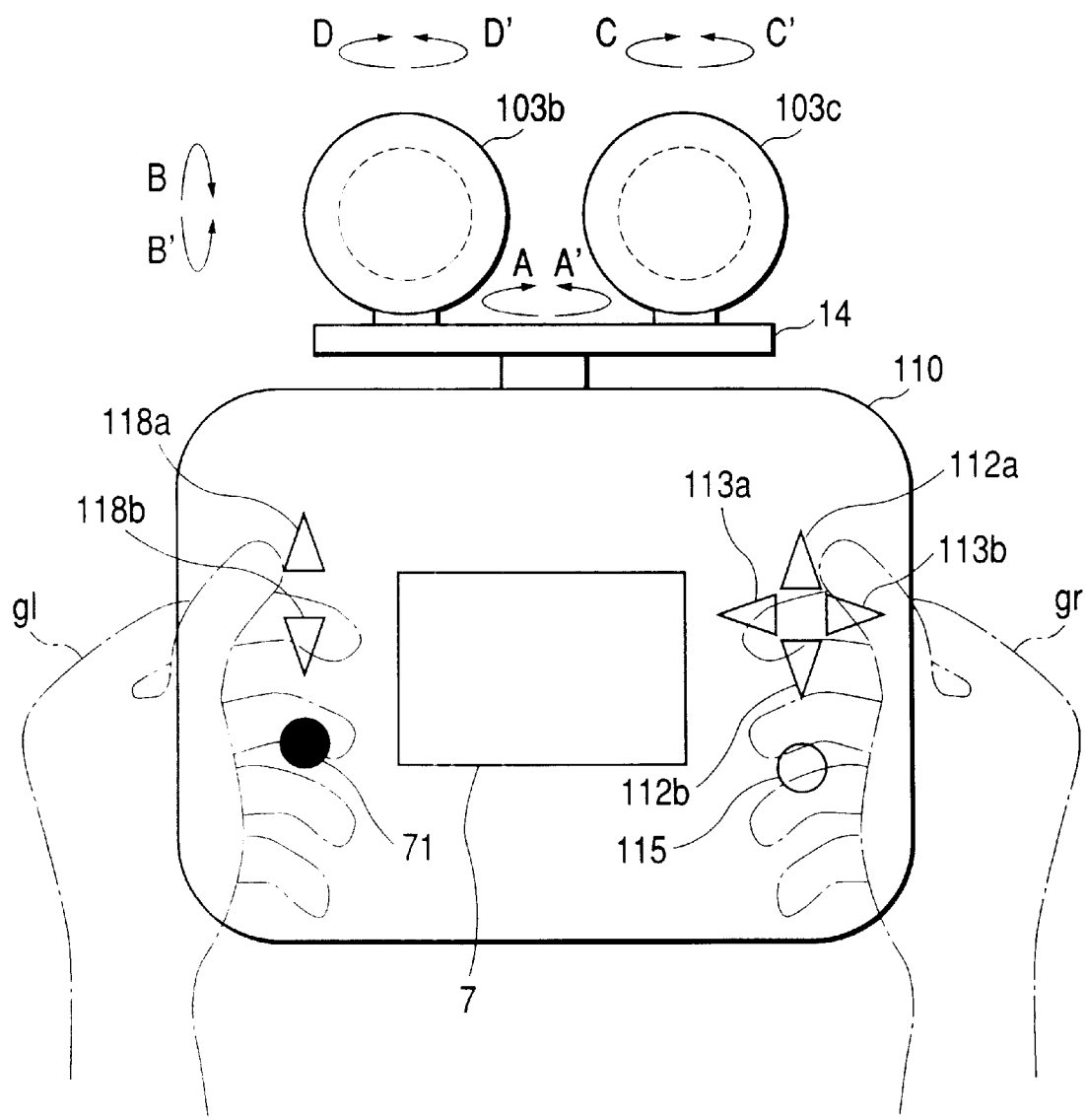
FIG. 19 is a perspective view showing the external appearance of the compound eye camera apparatus.

FIG. 18 is a block diagram showing the configuration of a compound eye camera apparatus constituting a seventh embodiment, and FIG. 19 is an external view of such compound eye camera apparatus. In these drawings, components the same as those in the sixth embodiment are represented by the same numbers and will not be explained further.

Referring to FIG. 18, camera heads 103a, 103b respectively contain the image pickup lens 101a and the image pickup element 102a, and the image pickup lens 101b and the image pickup element 102b.

There are also provided a convergence angle detection unit 116 for detecting the convergence angle formed by the optical axes of the image pickup lenses 101a and 101b; a convergence angle drive mechanism 117 for independently driving the camera heads 103a, 103b; and a convergence angle operation unit 118 for causing the convergence angle drive mechanism 117 to rotate the camera heads 103a, 103b in mutually opposite directions thereby varying the convergence angle of the image pickup lenses 101a, 101b.

In FIG. 19, 118a and 118b correspond to the convergence angle operation unit 118 in FIG. 18. An image pickup mode switching unit 171 selects either the stereoscopic image pickup mode for picking up a stereoscopic image or the panoramic image pickup mode for obtaining a two-dimensional image of a wide image angle by synthesizing plural picked-up images. In the present embodiment, the camera heads 103a, 103b are rotatable independently in directions C, C' and D, D', in addition to the rotating directions A, A' and B, B' in the foregoing sixth embodiment.

Owing to such mechanism of the camera heads 103a, 103b, the compound eye camera apparatus can provide a two-dimensional image by synthesizing plural images picked up in the panoramic image pickup mode.

The display unit employed in the foregoing sixth embodiment is associated with a drawback that the resolution in the horizontal direction is reduced to ½ in the case of displaying a two-dimensional image. In order to avoid such drawback, the present embodiment employs the display of a rear barrier lenticular system proposed before by the present applicant in the Japanese Patent Application Nos. 8-148601 and 8-148612.

The working principle of the display of a rear barrier lenticular system has already been explained with reference to FIGS. 2A and 2B.

In the present embodiment, the main body 110 of the compound eye camera apparatus is designed so as to be held with both hands g1, gr of the user, so that the position of the display unit 107 to be observed by the user is more stable.

Figure 20:
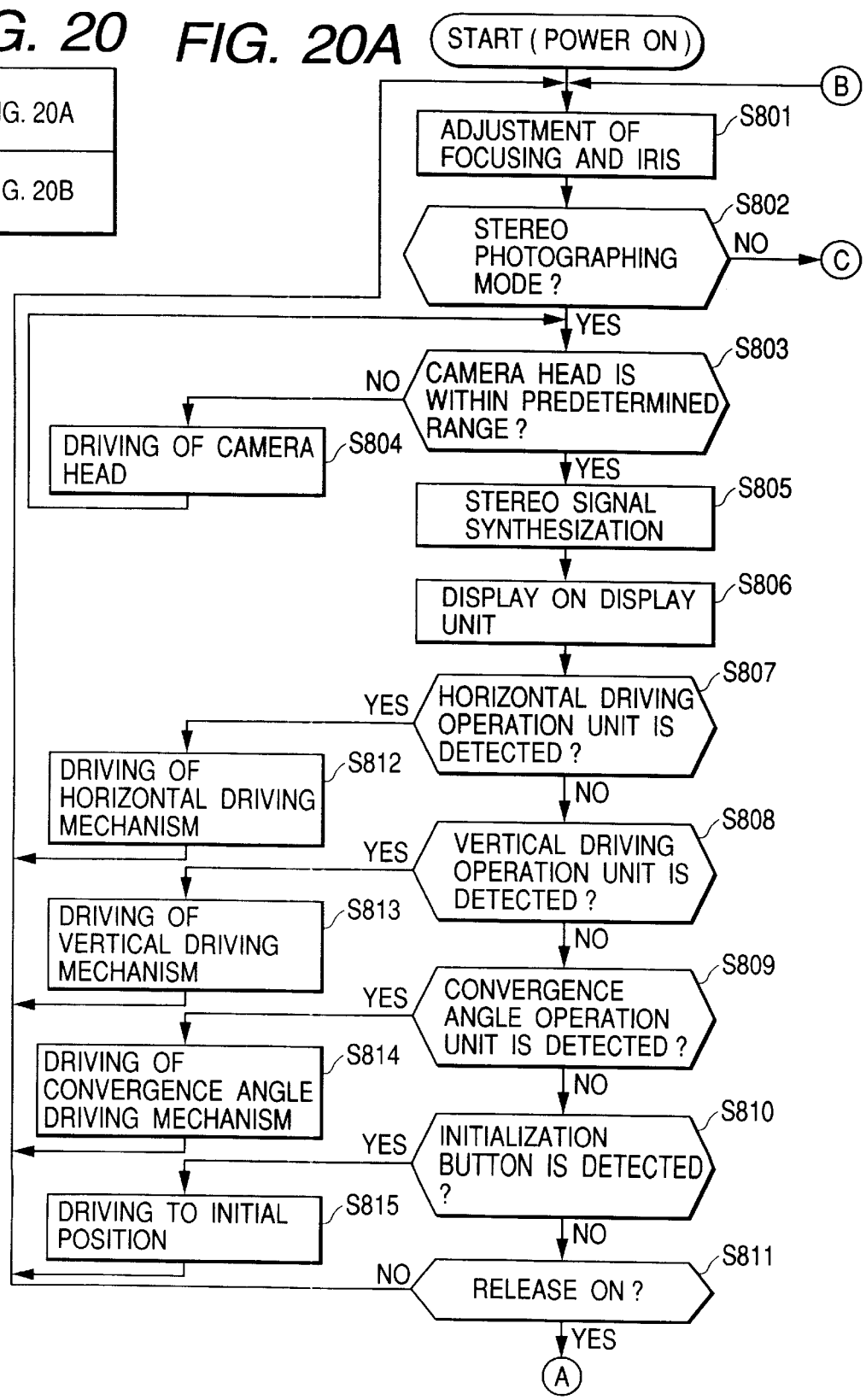
FIG. 20, which is composed of FIGS. 20A and 20B, is a flow chart showing the operation control sequence of the compound eye camera apparatus.
Figure 20B:
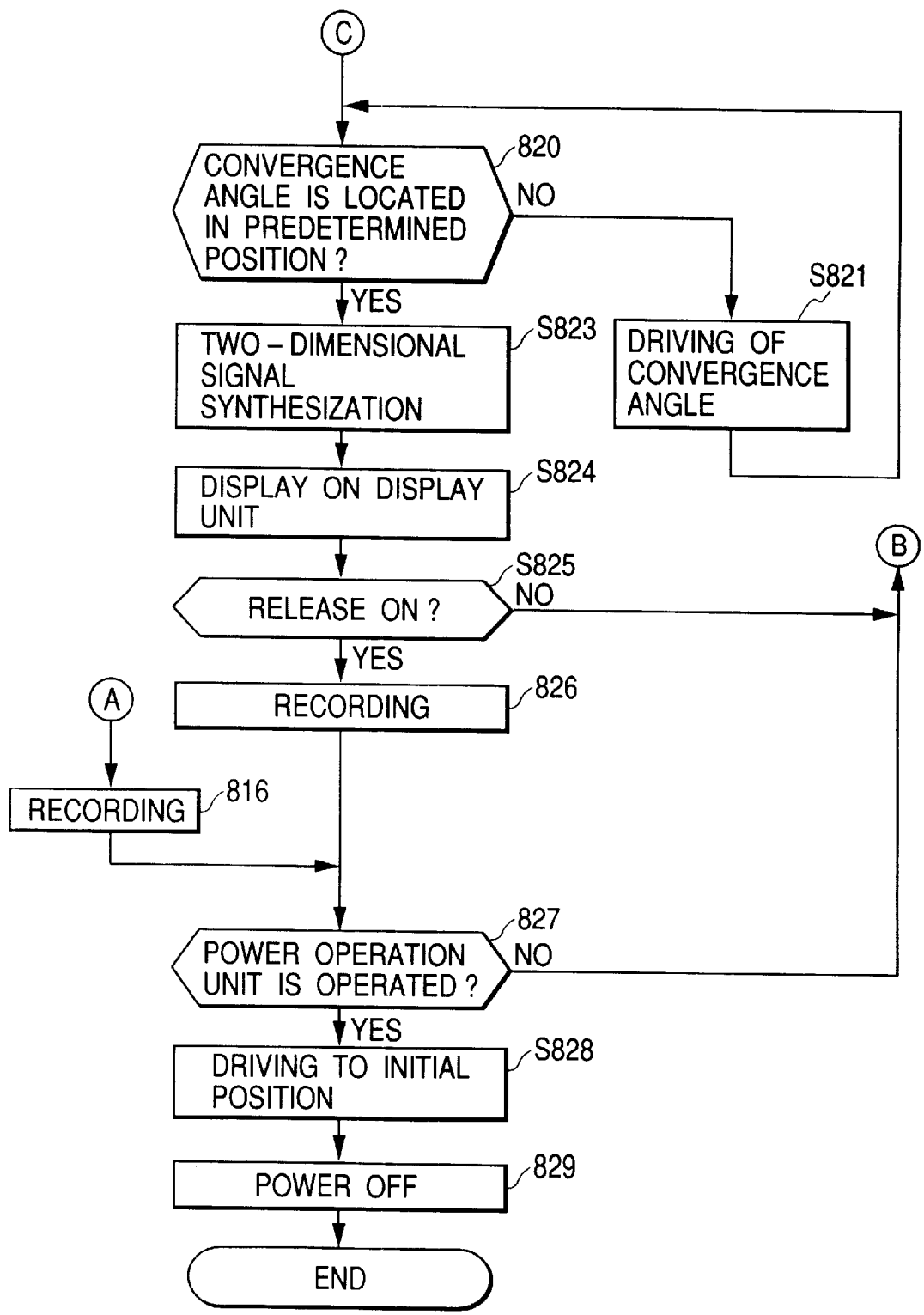

FIGS. 20A and 20B are flow charts showing the control sequence of the compound eye camera apparatus. The sequence is executed by the system controller 109, unless otherwise specified. When a power operation unit (not shown) of the compound eye camera apparatus is operated, electric power is supplied thereto and the control sequence is initiated.

At first there are executed focusing and diaphragm adjustment for the object (step S801). Then it is discriminated whether the current image pickup mode is the stereoscopic image pickup mode (step S802), and the sequence proceeds to a step S803 in the case of the stereoscopic image pickup mode, or to a step S820 in the case of the panoramic image pickup mode.

At first there will be explained the stereoscopic image pickup mode. The current rotary positions of the camera heads 103a, 103b are detected by the rotary position detection unit 105 and the convergence angle detection unit 116, and it is discriminated whether the positions of the camera heads 103a, 103b are within a predetermined range (step S803).

If the camera heads 103a, 103b are outside the predetermined range, they are respectively driven by the horizontal drive mechanism 104a, the vertical drive mechanism 104b and the convergence angle drive mechanism 117 in such a manner that the camera heads 103a, 103b are brought to a predetermined direction (step S804).

Figure 21:
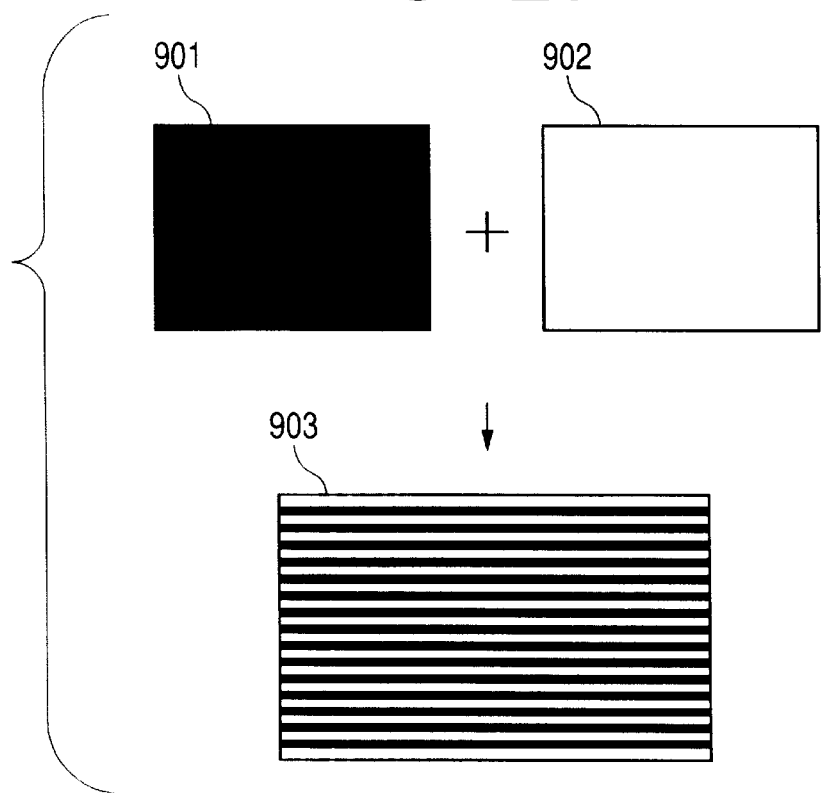
FIG. 21 is a view showing the mode of display of horizontal striped images.

When the image signals accumulated in the image pickup elements 102a, 102b are transferred to the signal synthesis unit 106, signal synthesis is executed on such image signals (step S805). The image synthesis process in the signal synthesis unit 106 will be explained in the following. For displaying a stereoscopic image, the display unit 107 is required to display an image in which the left and right images are alternated in horizontal stripes, as shown in FIG. 21. The signal synthesis unit 106 generates from the image signals 901, 902 supplied from the image pickup elements 102a, 102b, an image 903 consisting of horizontal stripe-shaped images.

The image signal generated in the signal synthesis unit 106 is displayed on the display unit 107 (step S806). In the stereoscopic image pickup mode, the PDLC 905 of the display unit 107 is in a translucent state by the application of a voltage as explained before, so that the user can stereoscopically observe the displayed image.

Then it is discriminated whether the horizontal drive operation units 112a, 112b have been operated (step S807), and, if the unit 112a or 112b has been operated, the arm 114 is driven by a predetermined amount respectively in the direction A or A' by the horizontal drive mechanism 104a (step S812). Thereafter the sequence returns to the step S802.

If in step S807 operation of the horizontal drive operation unit 112a, 112b is not detected, it is discriminated whether the vertical drive operation units 113a, 113b have been operated (step S808), and, if the unit 113a or 113b has been operated, the camera heads 103a, 103b are driven by a predetermined amount respectively in the direction B or B' by the vertical drive mechanism 104b (step S813). Thereafter the sequence returns to the step S802.

If the user wishes to adjust the stereoscopic feeling of the stereoscopic image (amount of protrusion of the image from the display plane), the convergence angle operation units 118a, 118b are operated. On the other hand, if in step S808 operation of the vertical drive operation units 113a is not detected, 113b, it is discriminated whether the convergence angle operations units 118a, 118b have been operated (step S809).

If the convergence angle operation unit 118a has been operated, the camera heads 103a, 103b are driven respectively in the directions C' and D by the convergence angle drive mechanism 117, but, if the convergence angle operation unit 118b has been operated, the camera heads 103a, 103b are driven respectively in the directions C and D' by the convergence angle drive mechanism 117 (step S814). Thereafter the sequence returns to the step S802.

If an step S809 does not detect the operation of the convergence angle operation units 118a, 118b, it is discriminated whether the initializing button 115 has been operated (step S810), and, if operated, it is detected, by the rotary position detection unit 105 and the convergence angle detection unit 116, the current rotary position of the camera heads 103a, 103b with respect to the main body 110 of the compound eye camera and the camera heads 103a, 103b are accordingly driven by the horizontal drive mechanism 104a, the vertical drive mechanism 104b and the convergence angle drive mechanism 117 in such a manner that the positional relationship between the camera heads 103a 103b and the main body 110 reaches a state shown in FIG. 19 (initial position) (step S815). Thereafter the sequence returns to the step S802.

If in step S810 does not detect the operation of the initializing button 115 is not detected, it is discriminated whether the shutter release button 111 has been operated (step S811), and, if operated, the image signal synthesized in the signal synthesis unit 106 is recorded, together with information, indicating that the image signal has been picked up in the stereoscopic image pickup mode, by the recording unit 108 (step S816). On the other hand, if the shutter release button 111 has not been operated, the sequence returns to the step S802. The above-explained sequence completes an image pickup operation in the stereoscopic image pickup mode.

In the following there will be explained the operations in the panoramic image pickup mode. If the step S802 identifies that the current mode is not the stereoscopic image pickup mode, the rotary position detection unit 105 detects the convergence angle of the image pickup lenses 101a, 101b, then a target convergence angle is calculated from the current focal lengths of the image pickup lenses 101a, 101b and the camera heads 103a, 103b are driven by the horizontal drive operation unit 112 so as to attain such target convergence angle (steps S820, S821).

Figure 22:
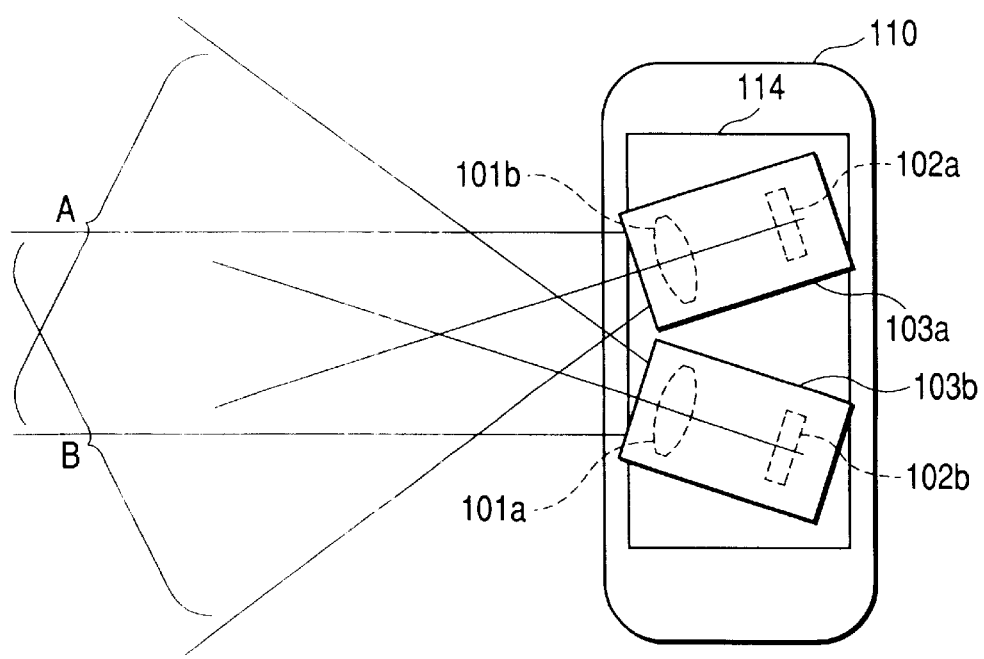
FIG. 22 is a view showing the state of camera heads 103a, 103b driven so as to obtain a desired convergence angle.

FIG. 22 shows the state of the camera heads 103a, 103b to be driven so as to attain the target convergence angle. In FIG. 22, A and B respectively indicate the image pickup light beams of the image pickup lenses 101a, 101b. As shown in this drawing, the camera heads 103a, 103b are directed in different directions, except for a partial overlapping of the image pickup areas, so that there can be obtained a panoramic image with a wide image angle by connecting the images, obtained from the image pickup elements 102a, 102b, at the overlapping image pickup area.

In the state shown in FIG. 22, the image pickup lenses 101a, 101b have view points in different positions, so that the images obtained from the image pickup elements 102a, 102b contain a parallax and do not mutually coincide in a strict sense, at the connection portion of the images. However, if the distance to the object is sufficiently large, the images can be regarded to have been picked up from the same view point, so that the difference in the overlapping portion of the respective image pickup areas, resulting from the difference in the view points, becomes scarcely noticeable and the images can therefore be matched at the overlapping portion.

Figure 23:
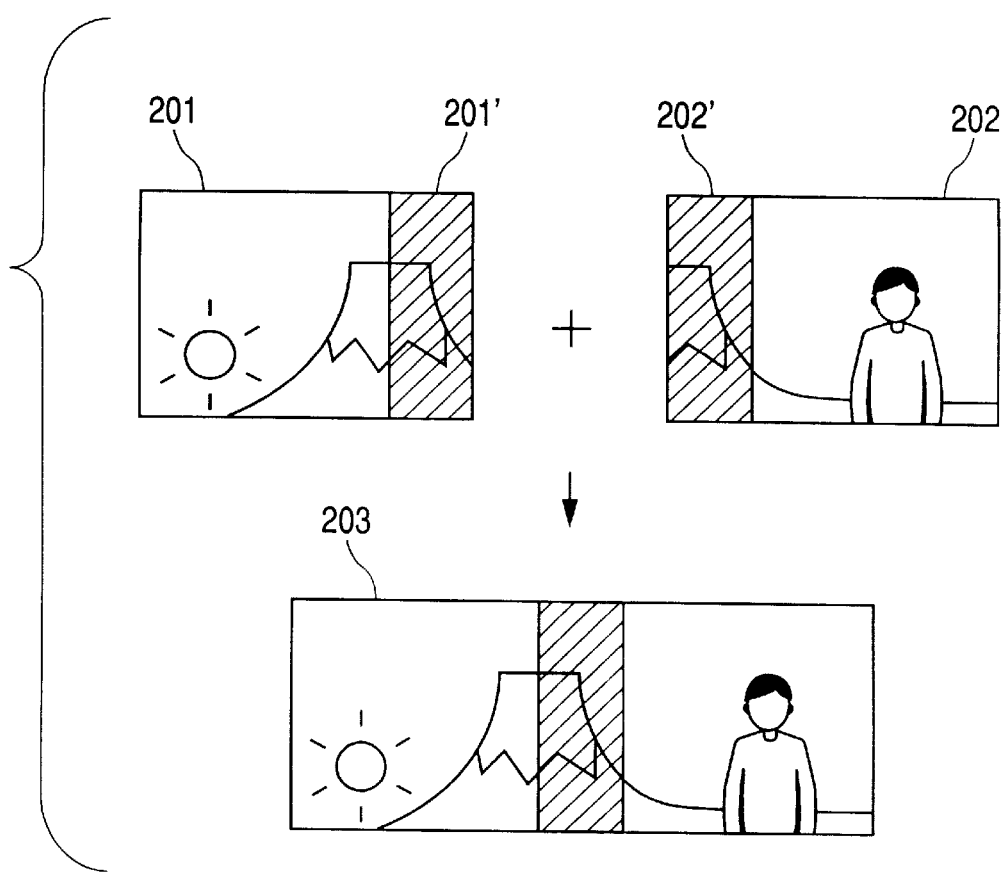
FIG. 23 is a view showing the mode of image synthesis in the signal synthesis unit 6 in a panorama image pickup mode.

When the image signals accumulated in the image pickup elements 102a, 102b are read, the signal synthesis unit 106 executes the signal synthesis on such image signals (step S823). FIG. 23 illustrates the synthesis process in the signal synthesis unit 106 in the panoramic image pickup mode, wherein 201, 202 indicates a set of image signals respectively obtained from the image pickup elements 102a, 102b, while 203 indicates an image signal after the synthesis in the signal synthesis unit 106, and hatched areas 201', 202' indicate the overlapping areas of the image signals 201, 202. As shown in this drawing, the image signals 201, 202 obtained from the image pickup elements 102a, 102b are superposed in such a manner that the overlapping portions of the left and right images mutually match, and a two-dimensional image 203 is generated by deleting the overlapping portion 202' from the image signal 202.

The obtained image signal is displayed on the display unit 107 (step S824). In this state the user can observe the object, and the two-dimensional image can be displayed with a high definition, since the PDLC 905 is in the scattering state, without the applied voltage.

Then, when operation of the shutter release button 111 is detected (step S825), the image signal synthesized in the signal synthesis unit 106 is recorded, together with information indicating the image pickup mode by the recording unit 108 (step S826). On the other hand, if the shutter release button 111 has not been operated, the sequence returns to the step S802. The above-explained sequence completes an image pickup operation in the panoramic image pickup mode.

The sequence from the step S801 to S826 is repeated until the unrepresented power operation unit is actuated (step S827). If in step S827 operation of the unshown power operation unit is detected, it then is detected, by the rotary position detection unit 105 and the convergence angle detection unit 116, the current rotary positions and the convergence angles of the camera heads 103a, 103b with respect to the main body 110 of the compound eye camera and the camera heads 103a, 103b are accordingly driven by the horizontal drive mechanism 104a, the vertical drive mechanism 104b and the convergence angle drive mechanism 117 in such a manner that the positional relationship between the camera heads 103a, 103b and the main body 110 reaches a state shown in FIG. 19 (initial position) (step S828). Thereafter the power source of the compound eye camera apparatus is turned off to terminate the power supply thereto (step S829).

As explained in the foregoing, the compound eye camera apparatus of the present embodiment, being provided with the panoramic image pickup mode for obtaining an image signal by synthesizing plural images obtained by the compound eye camera, can provide a panoramic image of a wide horizontal image angle, namely an image of high image quality with a larger number of pixels, by the synthesis of two image signals, in addition to the stereoscopic image. Also the display unit 107, employing the display of a rear barrier lenticular system, can fully utilize the display ability not only in the display of a stereoscopic image but also in the display of a panoramic image.

In the foregoing seventh and eighth embodiments, the operation members such as the horizontal drive operation unit 112 are provided in a position operable with the thumb when the user holds the main body of the compound eye camera, but the positions of such operation members are not critical and they may be provided, for example, in a position operable with the index finger.

Also in the foregoing seventh and eighth embodiments, the camera heads 103a, 103b are automatically rotated, prior to the shut-off of the power supply, to the initial position so that they do not protrude from the front or rear end of the main body 110, whereby the camera is made less bulky at the carrying: but such rotation may be made manually instead of by automatic rotation.

In the foregoing embodiments, in forming optical images on image planes by condensing the light from an object through plural image pickup lenses and displaying a stereoscopic image using image display means based on the image signal obtained from the plural image pickup elements respectively provided on the image planes of the plural image pickup lenses, the plural image pickup lenses are rendered rotatable at least in the horizontal direction, with respect to the housing which supports the image display means, without change in the relative positional relationship of the optical axes, so that it is rendered possible to change the object while observing the stereoscopic image of the object even in the compound eye camera apparatus equipped with image display means having a narrow viewing field for the stereoscopic image. Consequently, even if a stereoscopic image display device with a narrow viewing area is employed as the view finder, the stereoscopic image can be picked up always in a stable state.

Also for forming optical images on image planes by condensing the light from an object through plural image pickup lenses and displaying a stereoscopic image using image display means based on the image signal obtained from the plural image pickup elements respectively provided on the image planes of the plural image pickup lenses, rotary operation means is provided, for instructing the rotation amount and the rotating direction to each of the plural image pickup lenses in order to rotate such plural image pickup lenses with respect to the housing which supports the image display means, in a position operable with the thumb or the index finger of the user when the user holds the housing, so that it is rendered possible to change the object while observing the stereoscopic image of the object even in the compound eye camera apparatus equipped with image display means having a narrow viewing field for the stereoscopic image. Consequently, even in a compound eye camera apparatus employing a stereoscopic image display device with a narrow viewing area as the view finder, the pickup of the stereoscopic image and the change in the image pickup direction can be easily achieved always in a stable state.

Furthermore, the image display means, being provided with a display panel for displaying the image and a lenticular lens in front of the display panel, allows the observer to observe the stereoscopic image without any auxiliary device. Consequently, the user can always pick up and observe the stereoscopic image in an easy manner, with the compound eye camera apparatus only.

Furthermore, the image display means, being provided with a display panel for displaying the image, two lenticular lenses positioned behind the display panel and having mutually different directions of arrangement, a transmitting light control member positioned between the two lenticular lenses and the display panel, for controlling the transmission or the scattering of light, and an opaque member having checker-patterned apertures and positioned behind the two lenticular lenses, allows the observer to observe both the stereoscopic image and the two-dimensional image without sacrificing the resolution. Also two-dimensional image can be displayed without losing resolution.

Furthermore, there is provided power operation means to be operated for terminating the power supply, and, in the case of operation of the power operation means, the plural image pickup lenses are rotated so as to reduce the amount of protrusion thereof from the housing before the power supply is turned off, so that the image pickup lenses can be stored in a compact manner and the compound eye camera apparatus is not bulky.

Furthermore, there is defined an initial position for the plural image pickup lenses and there is provided initial position operation means to be operated for rotating the plural image pickup lenses to such initial position, so that the image pickup direction can be promptly returned to the initial state and the image pickup operation can be promptly conducted for a new object.

Many widely different embodiments of the present invention may be constructed without departing from the spirit and scope of the present invention. It should be understood that the present invention is not limited to the specific embodiments described in the specification, except as defined in the appended claims.

What is claimed is:

1. A stereo camera comprising:

left and right image pickup means provided a predetermined distance apart from each other, for converting an object image to left and right image signals;

image processing means for performing a predetermined process to left and right image signals output from said left and right image pickup means;

recording means for recording output signals from said image processing means;

display means for displaying the output signals of said image processing means; and display control means for controlling said display means to display the left and right image signals in first and second displaying regions in a display screen of said display means so as to form a stereo image with a predetermined parallax at a position a predetermined distance apart from a surface of said display means, wherein said left and right image pickup means are mechanically and rotatable supported on said display means so as to vary an orientation of image pickup operation of said left and right image pickup means, and wherein said display control means causes said display means to selectively display the object image picked up by said left and right image pickup means in one of a stereoscopic image pickup mode and a two-dimensional image pickup mode.

2. A stereo camera according to claim 1, wherein said display means includes light emitting display elements and is adapted, by said display elements, to form a light emitting pattern having different directionalities in the display of odd-numbered lines of a striped image and in the display of even-numbered lines of the striped image.

3. A stereo camera according to claim 1, wherein said display means includes:

an illuminating light source;

an aperture mask having checker-patterned apertures that transmit light received from said illuminating light source;

a first lenticular lens that provides a light beam transmitted by said aperture mask with different directionalities respectively corresponding to odd-numbered lines and even-numbered lines of a striped image;

a second lenticular lens that provides a light beam transmitted by said first lenticular lens with a viewing area corresponding to each line of the striped image; and liquid crystal display means for displaying the striped image.

4. A stereo camera according to claim 1, further comprising:
memory means for storing images with a parallax, picked up by said left and right image pickup means;
wherein said display control means is adapted to synthesize the images with a parallax, stored in said memory means, into a striped image and to cause said striped image to be displayed.

5. A stereo camera according to claim 1, further comprising:
mode setting means for selectively setting the camera in the stereoscopic image pickup mode or the two-dimensional image pickup mode;
wherein said display means selectively displays the image as one of a stereoscopic image display, in which different directionalities are given to the display of the odd-numbered lines and the display of the even-numbered lines, and a two-dimensional image display, in which different directionalities are not given to the display of every line; and
wherein said display control means is adapted, when the camera is set in the stereoscopic image pickup mode, to synthesize the image with a parallax, picked up by said left and right image pickup means, into a striped image and to cause said display means to display a stereoscopic image, and, when the camera is set in the two-dimensional image pickup mode, to cause said display means to two-dimensionally display the two-dimensional images picked up by said left and right image pickup means.

6. A stereo camera according to claim 1, further comprising:
a digital interface connectable with an external equipment through an interface cable;
wherein said control means is adapted to transmit the image, synthesized by said display control means, through said digital interface.

7. A stereo camera according to claim 1, wherein said display means displays the stereo image divided in stripes by every scanning line or by every plural scanning lines, with different directionalities for the display of stripe images in even-numbered lines, thereby providing a stereoscopic image at a predetermined observing position; and
said display control means divides each of two images with a parallax, picked up by said plural image pickup means, into stripes in the horizontal direction, synthesizing a striped image by alternately arranging thus divided stripes by every line, and
outputting said synthesized striped image to said display means.

8. A stereo camera according to claim 5, wherein the two-dimensional image pickup mode is a panoramic image pickup mode; and
wherein said display control means is adapted, when the camera is set in the panoramic image pickup mode, to combine left and right images, picked up by said left and right image pickup means and having overlapping portions, in a lateral direction in such a manner that the overlapping portions mutually overlap thereby forming a panoramic image and to cause said display means to two-dimensionally display the panoramic image.

9. A stereo camera according to claim 5,
wherein said mode setting means selectively sets the camera in a recording mode or a reproducing mode; and
wherein the camera further comprises:
memory means for storing images picked up by said left and right image pickup means; and
control means for controlling said memory means and adapted, when the camera is set in the recording mode, to cause said memory means to store images with a parallax or two-dimensional images picked up by said left and right image pickup means, and, when the camera is set in the reproducing mode, to read out the images with parallax or the two-dimensional images stored by said memory means; and
wherein said display control means is adapted to synthesize the images with a parallax or the two-dimensional images read out from said memory means and to cause said display means to display said synthesized image.

10. A stereo camera according to claim 9,
wherein the two-dimensional images stored by said memory means are left and right images picked up by said left and right image pickup means and having overlapping portions; and
said display control means is adapted, when the left and right images having overlapping portions are read out from said memory means, to combine the left and right images in a lateral direction in such a manner that the overlapping portions mutually overlap thereby forming a panoramic image and to cause said display means to two-dimensionally display the panoramic image.

* * * * *

UNITED STATES PATENT AND TRADEMARK OFFICE
CERTIFICATE OF CORRECTION

PATENT NO. : 6,278,480 B1
DATED : August 21, 2001
INVENTOR(S) : Sunao Kurahashi et al.

It is certified that error appears in the above-identified patent and that said Letters Patent is hereby corrected as shown below:

<u>Title page,</u>
Item [56], References Cited, insert -- ISONO, "Condition for Time-Shared Stereoscopic Observation" Journal of Television Association, Vol.41, No.6, pp. 546-555 (1987) --.
Item [57], ABSTRACT,
Line 1, "camera" should read -- camera is --.

<u>Column 1,</u>
Line 41, "such" should read -- such a --; and
Line 44, "seen" should read -- as seen --.

<u>Column 2,</u>
Line 27, "the" (first occurrence) should be deleted;
Line 43, "the systems utilizing" should read -- systems utilizing a --;
Line 45, "of the" should read -- of --;
Line 45, "in" should read -- in the --; and "the" should read -- a --;
Line 46, "the" should read -- a --;
Line 50, "the" should read -- a --;
Line 52, "the" should be deleted;
Line 54, "by the" should read -- by --;
Line 62, "indicated" should read -- indicates --; and "the" should be deleted;
Line 64, "indicated" should read -- indicate --;
Line 65, "give the" should read -- produce a --; and
Line 66, "was" should read -- is --.

<u>Column 3,</u>
Line 2, "in the" should read -- in --;
Line 5, "the" should be deleted;
Line 6, "picked up" should read -- taken --;
Line 7, "the" (first occurrence) should read -- a -- and "or the" should read -- or --;
Line 8, "the" should read -- a --;
Line 25, "according" should read -- according to --; and
Line 40, "according" should read -- according to --.

<u>Column 5,</u>
Line 49, "Thus" should read -- Thus, -- and "light" should read -- lights --; and
Line 50, "lights" should read -- light --.

<u>Column 10,</u>
Line 60, "images" should read -- images at -- and "and" should read -- and at --.

UNITED STATES PATENT AND TRADEMARK OFFICE
CERTIFICATE OF CORRECTION

PATENT NO. : 6,278,480 B1
DATED : August 21, 2001
INVENTOR(S) : Sunao Kurahashi et al.

It is certified that error appears in the above-identified patent and that said Letters Patent is hereby corrected as shown below:

Column 11,
Line 59, "syntheses, schemes" should read -- syntheses schemes, --; and
Line 64, "schemes" should read -- scheme --.

Column 12,
Line 44, "e" should read -- (e) --;

Column 13,
Line 27, "9'" should read -- 9', --.

Column 14,
Line 38, "the" should read -- of the --; and
Line 47, "the" should read -- to the --.

Column 15,
Line 29, "the" should read -- is the --.

Column 18,
Line 56, "In" should read -- in --.

Column 20,
Line 63, "of the" should read -- of an --.

Column 22,
Line 64, "113a" should read -- 113a and 113b --; and
Line 65, "113b," should be deleted.

Column 23,
Line 8, "an" should be deleted; and
Line 23, "does not detect" should be deleted.

Column 25,
Line 5, "carrying:" should read -- carrying; --.

Column 27,
Line 6, "means;" should read -- means, --;
Line 15, "mode;" should read -- mode, --;
Line 23, "line; and" should read -- line, and --; and
Line 37, "cable;" should read -- cable, --.

UNITED STATES PATENT AND TRADEMARK OFFICE
CERTIFICATE OF CORRECTION

PATENT NO. : 6,278,480 B1
DATED : August 21, 2001
INVENTOR(S) : Sunao Kurahashi et al.

It is certified that error appears in the above-identified patent and that said Letters Patent is hereby corrected as shown below:

<u>Column 28,</u>
Line 7, "mode; and" should read -- mode, and --;
Line 18, "mode;" should read -- mode, --; and
Line 30, "means; and" should read -- means, and --.

Signed and Sealed this

Twenty-third Day of July, 2002

*Attest:*

*Attesting Officer*

JAMES E. ROGAN
*Director of the United States Patent and Trademark Office*